United States Patent
Liaw

(10) Patent No.: US 12,520,471 B2
(45) Date of Patent: Jan. 6, 2026

(54) MEMORY DEVICE

(71) Applicant: Taiwan Semiconductor Manufacturing Company, Ltd., Hsinchu (TW)

(72) Inventor: Jhon-Jhy Liaw, Zhudong Township, Hsinchu County (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 429 days.

(21) Appl. No.: 18/315,023

(22) Filed: May 10, 2023

(65) Prior Publication Data

US 2024/0381609 A1    Nov. 14, 2024

(51) Int. Cl.
    *H10B 10/00*    (2023.01)
(52) U.S. Cl.
    CPC ........... *H10B 10/125* (2023.02); *H10B 10/12* (2023.02)
(58) Field of Classification Search
    CPC .............................. H10B 10/125; H10B 10/12
    See application file for complete search history.

(56) References Cited

U.S. PATENT DOCUMENTS

| | | |
|---|---|---|
| 9,209,247 B2 | 12/2015 | Colinge et al. |
| 9,236,267 B2 | 1/2016 | De et al. |
| 9,412,817 B2 | 8/2016 | Yang et al. |
| 9,412,828 B2 | 8/2016 | Ching et al. |
| 9,472,618 B2 | 10/2016 | Oxland |
| 9,502,265 B1 | 11/2016 | Jiang et al. |
| 9,520,482 B1 | 12/2016 | Chang et al. |
| 9,536,738 B2 | 1/2017 | Huang et al. |
| 9,576,814 B2 | 2/2017 | Wu et al. |
| 9,608,116 B2 | 3/2017 | Ching et al. |

*Primary Examiner* — Amar Movva
(74) *Attorney, Agent, or Firm* — Cooper Legal Group, LLC

(57) ABSTRACT

A memory device includes a first static random access memory (SRAM) cell, a second SRAM cell, and a first metal layer. The first SRAM cell includes first read-port pass-gate (PG) and pull-down (PD) transistors arranged in a Y-direction, and second read-port PG and PD transistors arranged in the Y-direction. The first and second read-port PD transistors share a first gate structure extending in an X-direction. The second SRAM cell includes third read-port PG and PD transistors arranged in the Y-direction, and fourth read-port PG and PD transistors arranged in the Y-direction. The third and fourth read-port PD transistors share a second gate structure extending in the X-direction. The first metal layer is over the first and second SRAM cells. The first metal layer includes first and second read bit-line conductors extending in the Y-direction and shared by the first and second SRAM cells.

20 Claims, 18 Drawing Sheets

MEMORY DEVICE

BACKGROUND

The semiconductor integrated circuit (IC) industry has experienced exponential growth. Technological advances in IC materials and design have produced generations of ICs where each generation has smaller and more complex circuits than the previous generation. In the course of IC evolution, functional density (i.e., the number of interconnected devices per chip area) has generally increased while geometric size (i.e., the smallest component (or line) that can be created using a fabrication process) has decreased. This scaling-down process generally provides benefits by increasing production efficiency and lowering associated costs. Such scaling down has also increased the complexity of processing and manufacturing ICs and, for these advancements to be realized, similar developments in IC processing and manufacturing are needed.

As integrated circuit (IC) technologies progress towards smaller technology nodes, fin field-effect transistors (FinFETs) and gate-all-around (GAA) transistors have been incorporated into memory devices (including, for example, static random-access memory, or SRAM, cells) to reduce chip footprint while maintaining reasonable processing margins.

However, as memory devices continue to be scaled down, the interconnection routing for memory devices uses too many routing resources and therefore impacts the cell scaling as well as memory performance. Accordingly, although existing technologies for fabricating memory devices have been generally adequate for their intended purposes, they have not been entirely satisfactory in all respects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
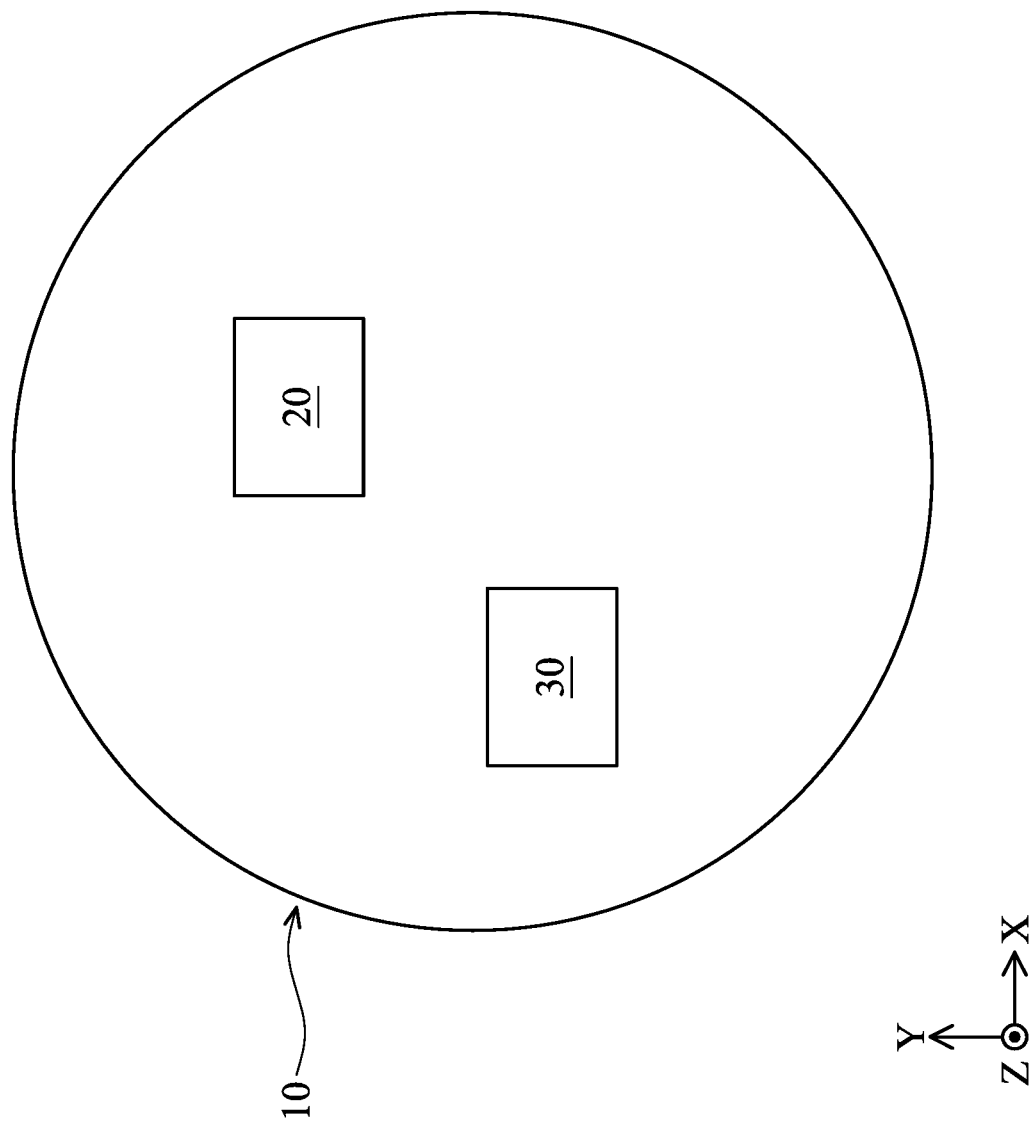
FIG. 1 is a fragmentary diagrammatic top view of an integrated circuit (IC) chip, in portion or entirety, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure is generally related to memory devices, and more particularly to static random-access memory (SRAM) cells having field-effect transistors (FETs), such as three-dimensional gate-all-around (GAA) transistors, in an integrated circuit (IC) structure. Generally, a GAA transistor may include a plurality of vertically stacked sheets (e.g., nanosheets), wires (e.g., nanowires), or rods (e.g., nanorods) in a channel region of the transistor, thereby allowing better gate control, lowered leakage current, and improved scaling capability for various IC applications.

The gate-all-around (GAA) transistor structures may be patterned by any suitable method. For example, the structures may be patterned using one or more photolithography processes, including double-patterning or multi-patterning processes. Generally, double-patterning or multi-patterning processes combine photolithography and self-aligned processes, allowing patterns to be created that have, for example, pitches smaller than what is otherwise obtainable using a single, direct photolithography process. For example, in one embodiment, a sacrificial layer is formed over a substrate and patterned using a photolithography process. Spacers are formed alongside the patterned sacrificial layer using a self-aligned process. The sacrificial layer is then removed, and the remaining spacers may then be used to pattern the GAA structure.

The present disclosure also relates to layouts and structures thereof of memory devices. More particularly, the present disclosure relates to three-port SRAM cell layout designs and structures. The present disclosure provides a compact three-port SRAM cell design having a width of four gate pitches (the so-called four-gate-pitch SRAM cell) and with multiple metal layers with metal conductors (or tracks) used for connections and over transistors. Transistors such as gate-all-around (GAA) transistors forming the three-port SRAM cell are fabricated over a substrate. Some of the metal conductors such as read bit-line conductors and VDD lines are fabricated in the lowest metal layer without extra landing pad, thereby reducing the capacitance. Other metal conductors such as read word-line conductors, write word-line conductors, write bit-line conductors, and write bit-line-bar (also referred to as complementary bit-line) conductors are fabricated in higher metal layers. The read word-line conductors, the write word-line conductors, the write bit-line conductors, and the write bit-line-bar conductors can be made wider than those metal conductors, thereby reducing the resistance.

Embodiments of the present disclosure offer advantages over the existing art, though it should be understood that other embodiments may offer different advantages, not all advantages are necessarily discussed herein, and no particular advantage is required for all embodiments. For example, embodiments discussed herein include an array of three-port SRAM cells each constructed by ten GAA transistors, in which two three-port SRAM cells in adjacent two rows share two read bit-lines in the lowest metal layer, that can improve cell performance and reduce the routing complexity of the three-port SRAM cell. The details of the present disclosure are described below in conjunction with the accompanying drawings, which illustrate the layout and structure of circuit cells, according to some embodiments.

The various aspects of the present disclosure will now be described in more detail with reference to the figures. For avoidance of doubts, an X-direction, a Y-direction, and a Z-direction in the figures are perpendicular to one another and are used consistently. Throughout the present disclosure, like reference numerals denote like features unless otherwise excepted.

FIG. 1 is a fragmentary diagrammatic top view of an integrated circuit (IC) chip 10, in portion or entirety, in accordance with some embodiments of the present disclosure. The IC chip 10 may include various passive microelectronic devices and active microelectronic devices, such as resistors, capacitors, inductors, diodes, p-type field effect transistors (PFETs), n-type field effect transistors (NFETs), metal-oxide semiconductor field effect transistors (MOSFETs), CMOS transistors, bipolar junction transistors (BJTs), laterally diffused MOS (LDMOS) transistors, high voltage transistors, high frequency transistors, other suitable components, or combinations thereof. The various microelectronic devices can be configured to provide the IC chip 10 with functionally distinct regions, such as a core region (also referred to as a logic region), a memory region (e.g., a static random access memory (SRAM) region), an analog region, a peripheral region (also referred to as an input/output (I/O) region), a dummy region, and/or other suitable region. In some embodiments, the IC chip 10 includes a memory region 20 and a logic region 30. The memory region 20 can include an array of memory cells, each of which includes transistors and interconnection structures (also referred to as routing structures) that combine to provide a storage device and/or a storage function, such as a flip flop, a latch, other suitable memory devices, or combinations thereof. In some embodiments, the memory region 20 is configured with static random-access memory (SRAM) cells, dynamic random-access memory (DRAM) cells, non-volatile random-access memory (NVRAM) cells, flash memory cells, other suitable memory cells, or combinations thereof. Logic region 30 can include an array of standard cells, each of which includes transistors and interconnection structures that combine to provide a logic device and/or a logic function, such as an inverter, an AND gate, an NAND gate, an OR gate, an NOR gate, a NOT gate, an XOR gate, an XNOR gate, other suitable logic devices, or combinations thereof. FIG. 1 has been simplified for the sake of clarity to better understand the inventive concepts of the present disclosure. Additional features can be added to the IC chip 10, and some of the features described herein can be replaced, modified, or eliminated in other embodiments of the IC chip 10.

Figure 2:
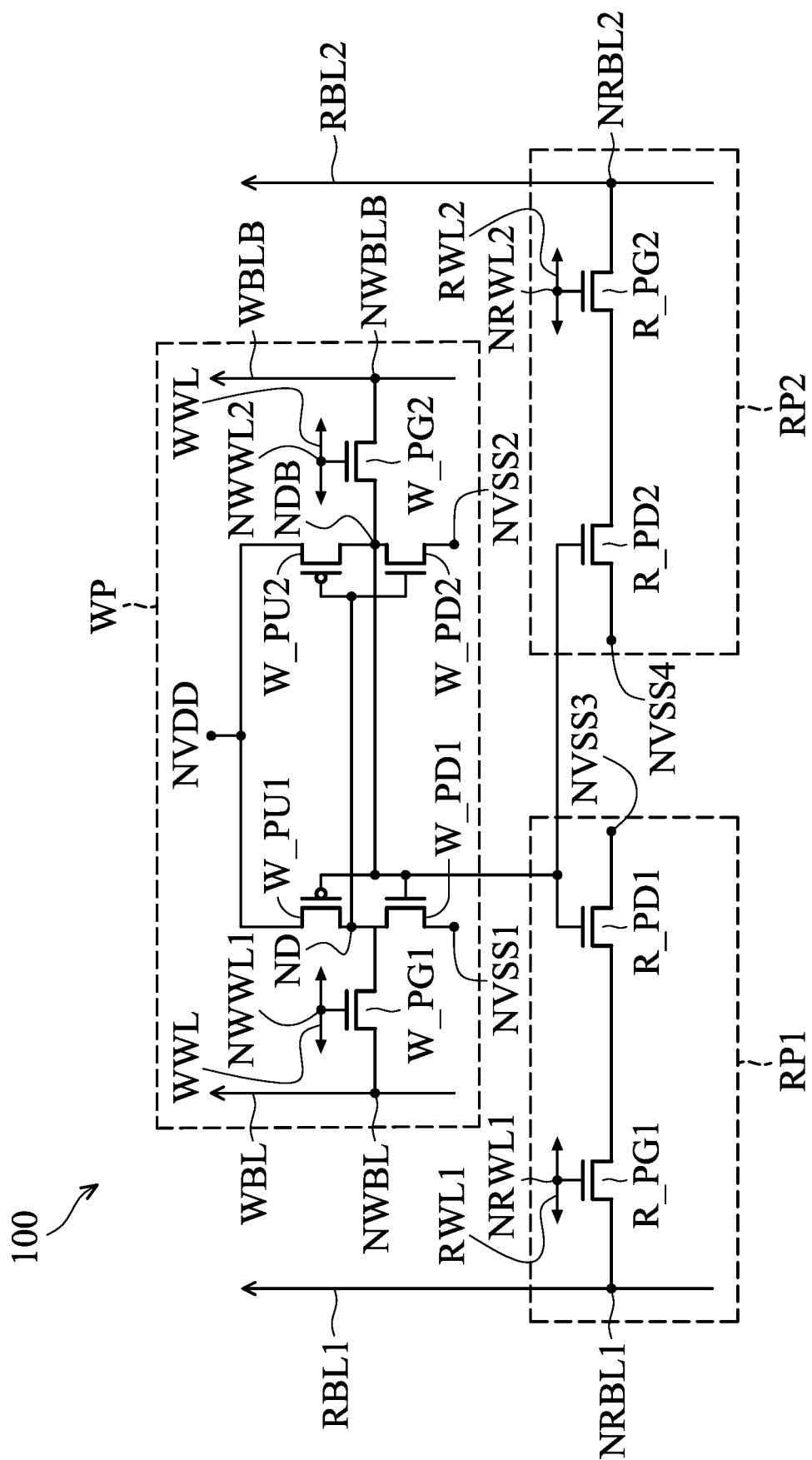
FIG. 2 is a circuit diagram for an SRAM cell that can be implemented in an array of three-port SRAM cells in the memory region of FIG. 1, in accordance with some alternative embodiments of the present disclosure.

FIG. 2 is a circuit diagram for an SRAM cell 100 that can be implemented in an array of three-port SRAM cells in the memory region 20 of FIG. 1, in accordance with some alternative embodiments of the present disclosure. The SRAM cell 100 includes a write-port circuit WP having data nodes ND and NDB, read-port circuits RP1 and RP2 coupled with data node ND. The SRAM cell 100 may also be referred to as three-port SRAM cells due to the SRAM cell 100 has three-port of write-port circuit WP and the read-port circuits RP1 and RP2, as shown in FIG. 2.

The write-port circuit WP includes two p-type transistors, such as write-port pull-up (PU) transistors W_PU1 and W_PU2, and four n-type transistors, such as write-port pull-down (PD) transistors W_PD1 and W_PD2 and write-port pass-gate (PG) transistors W_PG1 and W_PG2. The write-port PU transistor W_PU1, the write-port PU transistor W_PU2, the write-port PD transistor W_PD1, and the write-port PD transistor W_PD2 form a cross latch having two cross-coupled inverters. The write-port PU transistor W_PU1 and the write-port PD transistor W_PD1 form a first inverter while the write-port PU transistor W_PU2 and the write-port PD transistor W_PD2 form a second inverter.

Drains of the write-port PU transistor W_PU1 and the write-port PD transistor W_PD1 are coupled together and form data node ND. Drains of the write-port PU transistor W_PU2 and the write-port PD transistor W_PD2 are coupled together and form data node NDB. Gates of the write-port PU transistor W_PU1 and the write-port PD transistor W_PD1 are coupled together and to drains of the write-port PU transistor W_PU2 and the write-port PD transistor W_PD2. Gates of the write-port PU transistor W_PU2 and the write-port PD transistor W_PD2 are coupled together and to drains of the write-port PU transistor W_PU1 and the write-port PD transistor W_PD1.

Sources of write-port PU transistors W_PU1 and W_PU2 are coupled with a supply voltage node NVDD. In some embodiments, the supply voltage node NVDD is configured to receive a supply voltage VDD. Source of the write-port PD transistor W_PD1 is coupled with a reference voltage node NVSS1, and source of the write-port PD transistor W_PD2 is coupled with a reference voltage node NVSS2. In some embodiments, reference voltage node NVSS1 and reference voltage node NVSS2 are electrically coupled together and configured to receive a reference voltage VSS.

The write-port PG transistor W_PG1 functions as a pass gate between the data node ND and a write bit-line WBL, and the write-port PG transistor W_PG2 functions as a pass gate between the data node NDB and a write bit-line-bar WBLB. A drain of the write-port PG transistor W_PG1 is referred to as a write bit-line node NWBL and electrically coupled with the write bit-line WBL. A source of the write-port PG transistor W_PG1 is electrically coupled with the data node ND. A drain of the write-port PG transistor W_PG2 is referred to as a write bit-line-bar node NWBLB and electrically coupled with the write bit-line-bar WBLB. A source of the write-port PG transistor W_PG2 is electrically coupled with the data node NDB. A gate of the write-port PG transistor W_PG1 is referred to as a write word-line node NWWL1, a gate of the write-port PG transistor W_PG2 is referred to as a write word-line node NWWL2, and write word-line nodes NWWL1 and NWWL2 are electrically coupled with a write word-line WWL.

In a write operation of the SRAM cell 100 using the write-port circuit WP, data to be written to the SRAM cell 100 is applied to the write bit-line WBL and the write bit-line-bar WBLB. The write word-line WWL is then activated to turn on the write-port PG transistors W_PG1 and W_PG2. As a result, the data on the write bit-line WBL and the write bit-line-bar WBLB is transferred to and is stored in corresponding data nodes ND and NDB.

The read-port circuit RP1 includes two n-type transistors, such as read-port PD transistor R_PD1 and read-port PG transistor R_PG1. A source of the read-port PD transistor R_PD1 is coupled with a reference voltage node NVSS3. In some embodiments, the reference voltage node NVSS3 is configured to receive the reference voltage VSS. A gate of the read-port PD transistor R_PD1 is coupled with the data node NDB. A drain of the read-port PD transistor R_PD1 is coupled with a source of the read-port PG transistor R_PG1. A drain of the read-port PG transistor R_PG1 is referred to as a read bit-line node NRBL1 and electrically coupled with a read bit-line RBL1. A gate of the read-port PG transistor R_PG1 is referred to as a read word-line node NRWL1 and electrically coupled with a read word-line RWL1.

The read-port circuit RP2 includes two n-type transistors, such as read-port PD transistor R_PD2 and read-port PG transistor R_PG2. A source of the read-port PD transistor R_PD2 is coupled with a reference voltage node NVSS4. In some embodiments, the reference voltage node NVSS4 is configured to receive the reference voltage VSS. A gate of the read-port PD transistor R_PD2 is coupled with the data node NDB. A drain of the read-port PD transistor R_PD2 is coupled with a source of the read-port PG transistor R_PG2. A drain of the read-port PG transistor R_PG2 is referred to as a read bit-line node NRBL2 and electrically coupled with a read bit-line RBL2. A gate of the read-port PG transistor R_PG2 is referred to as a read word-line node NRWL2 and electrically coupled with a read word-line RWL2

In a read operation of the SRAM cell 100 using the read-port circuit RP1, the read bit-line RBL1 is pre-charged with a high logical value. The read word-line RWL1 is activated with a high logical value to turn on the read-port PG transistor R_PG1. The data stored in data node NDB turns on or off the read-port PD transistor R_PD1. For example, if data node NDB stores a high logical value, the read-port PD transistor R_PD1 is turned on. The turned-on read-port PG transistor R_PG1 and the turned-on read-port PD transistor R_PD1 then pull read bit-line RBL1 to the reference voltage VSS or a low logical value at the source of the read-port PD transistor R_PD1. On the other hand, if the data node NDB stores a low logical value, the read-port PD transistor R_PD1 is turned off and operates as an open circuit. As a result, the read bit-line RBL1 remains at the pre-charged high logical value. Detecting a logical value on the read bit-line RBL1 therefore reveals the logical value stored in the data node NDB.

Similarly, in a read operation of the SRAM cell 100 using the read-port circuit RP2, the read bit-line RBL2 is pre-charged with a high logical value. The read word-line RWL2 is activated with a high logical value to turn on the read-port PG transistor R_PG2. The data stored in data node NDB turns on or off the read-port PD transistor R_PD2. For example, if data node NDB stores a high logical value, the read-port PD transistor R_PD2 is turned on. The turned-on read-port PG transistor R_PG2 and the turned-on read-port PD transistor R_PD2 then pull read bit-line RBL2 to the reference voltage VSS or a low logical value at the source of the read-port PD transistor R_PD2. On the other hand, if the data node NDB stores a low logical value, the read-port PD transistor R_PD2 is turned off and operates as an open circuit. As a result, the read bit-line RBL2 remains at the pre-charged high logical value. Detecting a logical value on the read bit-line RBL2 therefore reveals the logical value stored in the data node NDB.

It is noted that the read-port circuits RP1 and RP2 are coupled with the same data node NDB. More specifically, the gate of the read-port PD transistor R_PD1 of the read-port circuit RP1 and the gate of the read-port PD transistor R_PD2 of the read-port circuit RP2 are coupled with the data node NDB, as discussed above. As such, the logical values on the read bit-lines RBL1 and RBL2 are the same during the read operation using the read-port circuits RP1 and RP2. This means that no additional invertor connected to the read bit-lines RBL1 or RBL2 is required for inverting one of the logical values on the read bit-lines to make the logical values on the read bit-lines RBL1 and RBL2 to be the same.

Figure 3:
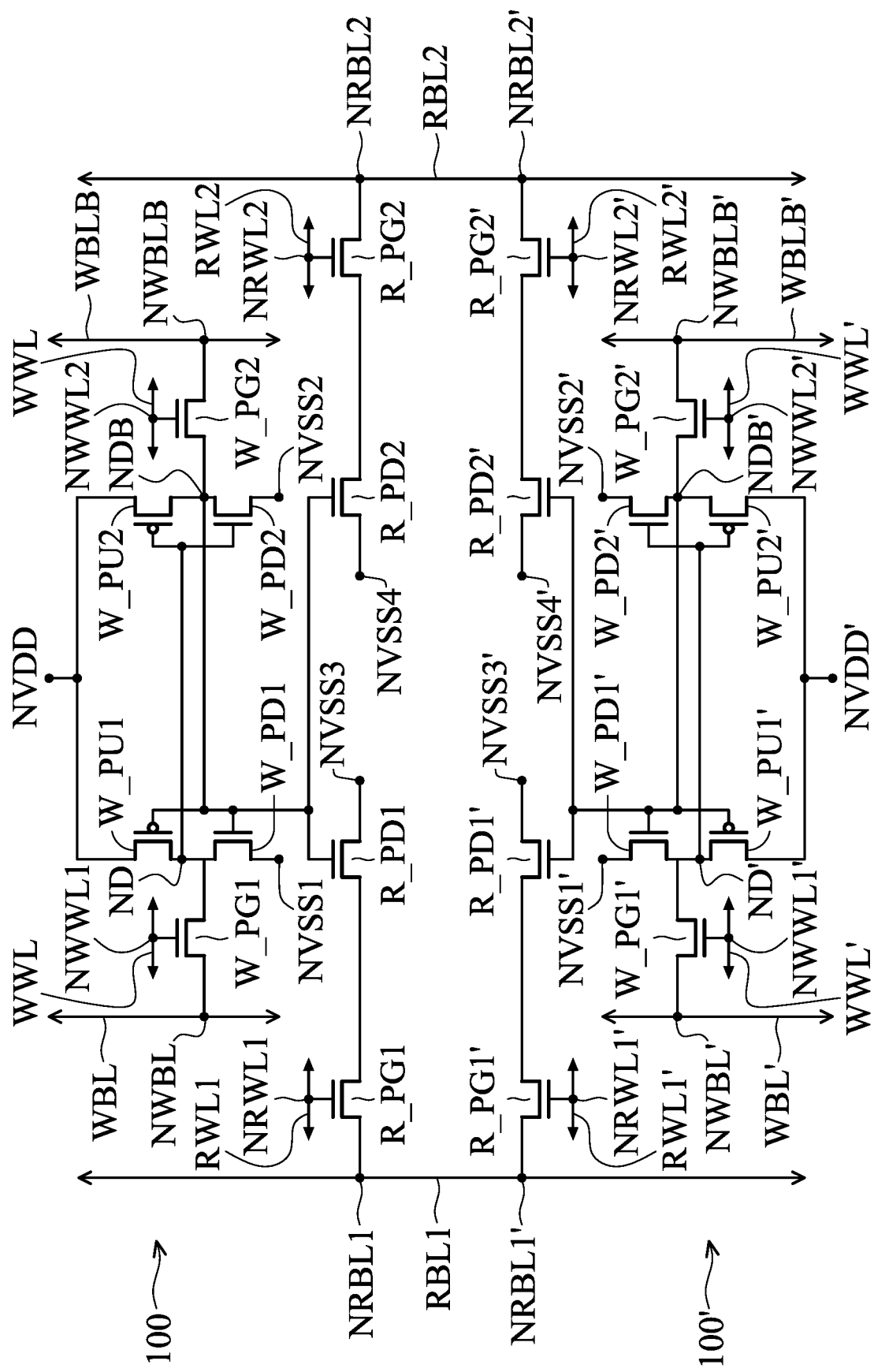
FIG. 3 is a circuit diagram for two SRAM cells that can be implemented in adjacent two rows of an array of three-port SRAM cells in the memory region of FIG. 1, in accordance with some alternative embodiments of the present disclosure.

FIG. 3 is a circuit diagram for two SRAM cells 100 and 100' that can be implemented in adjacent two rows of an array of three-port SRAM cells in the memory region 20 of FIG. 1, in accordance with some alternative embodiments of the present disclosure. For the sake of simplicity, take the SRAM cell 100 discussed above (in FIG. 2) as an example to illustrate the SRAM cells 100 and 100' in FIG. 3. The SRAM cell 100 may in a row of an array of three-port SRAM cells, and the SRAM cell 100' may be adjacent to the SRAM cell 100 and in an adjacent row of the array of the SRAM cells. The SRAM cells 100 and 100' are in the same column of the array of the three-port SRAM cells. The SRAM cells 100 and 100' have the same function and operation. The SRAM cells 100 and 100' also have the same features and components. For the sake of distinction, the reference numbers of the components in the SRAM cell 100' are additionally labeled with "'".

In the present embodiments, the read bit-line node NRBL1 of the read-port PG transistor R_PG1 of the SRAM cell 100 and the read bit-line node NRBL1' of the read-port PG transistor R_PG1' of the SRAM cell 100' are further coupled together and to the read bit-line RBL; and the read bit-line node NRBL2 of the read-port PG transistor R_PG2 of the SRAM cell 100 and the read bit-line node NRBL2' of the read-port PG transistor R_PG2' of the SRAM cell 100' are further coupled together and to the read bit-line RBL2. In other word, the SRAM cell 100 and 100' share the read bit-lines RBL1 and RBL2.

Each of the write word-lines is couple to gates of the write-port PG transistors of the SRAM cells in the same row of the array. For an example, the write word-line WWL is coupled to the gates of the write-port PG transistors (e.g., write-port PG transistors W_PG1 and W_PG2) of the SRAM cells in the same row as the SRAM cell 100. Further, the write word-line WWL' is coupled to the gates of the write-port PG transistors (e.g., write-port PG transistors W_PG1' and W_PG2') of the SRAM cells in the same row as the SRAM cell 100'.

The SRAM cells 100 and 100' are illustrated as an example. In some embodiments, each of the SRAM cells 100 and 100' shown in FIG. 2 has a total of ten transistors (including the write-port PU transistors W_PU1 and W_PU2, the write-port PD transistors W_PD1 and W_PD2, the write-port PG transistors W_PG1 and W_PG2, the read-port PD transistors R_PD1 and R_PD2, and the read-port PG transistors R_PG1 and R_PG2), such that the SRAM cells 100 and 100' may be referred to as 10T SRAM cells.

Figure 4:
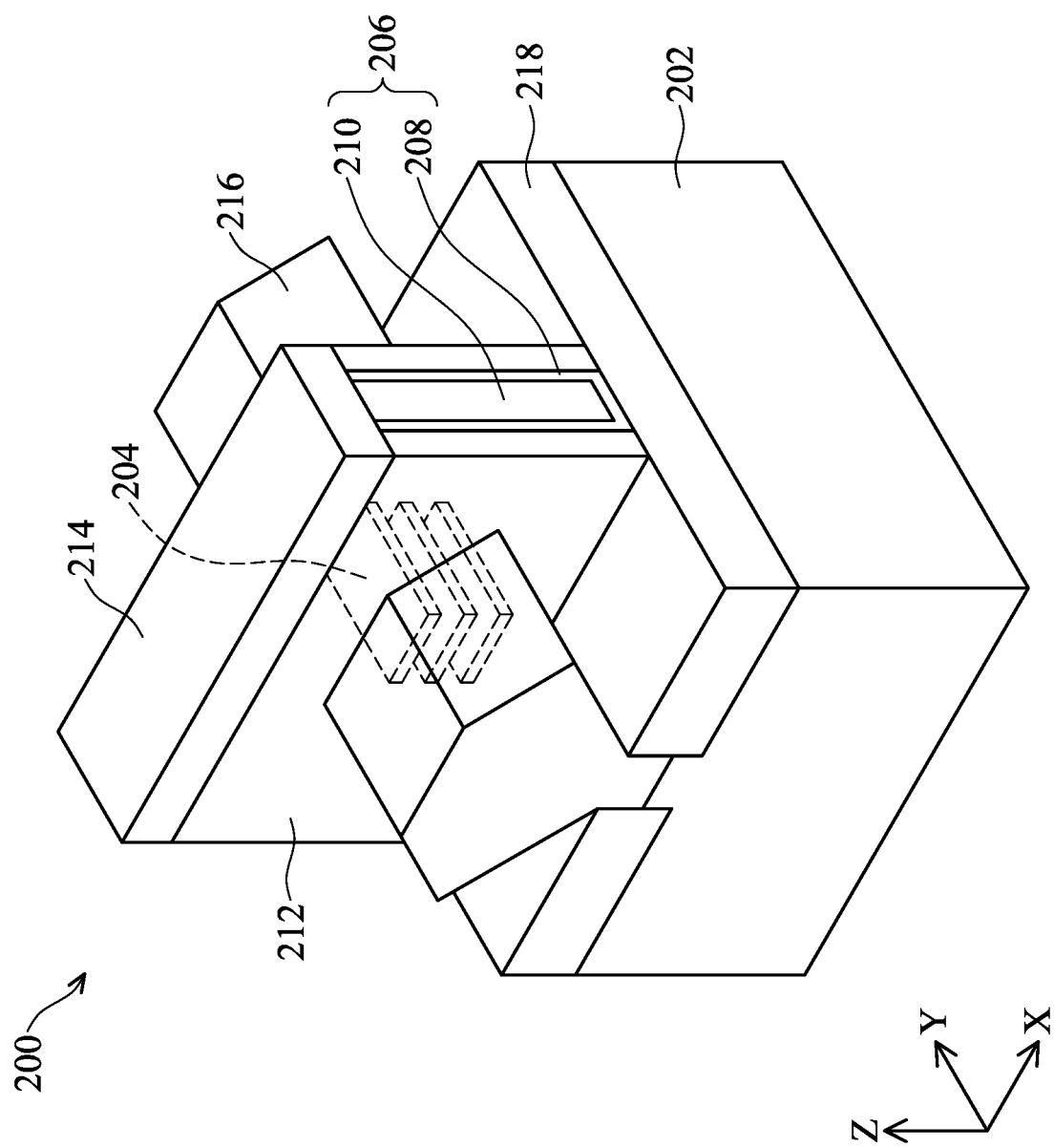
FIG. 4 is a perspective view of a GAA transistor in the SRAM cell, in accordance with some embodiments of the present disclosure.

Each of the SRAM cells 100 and 100' discussed above is constructed by transistors. The transistors may be planar transistors, fin field-effect transistor (FinFET) transistors, gate-all-around (GAA) transistors, nano-wire transistors, nano-sheet transistors, or a combination thereof. For the sake of providing an example, an exemplary GAA transistor is illustrated in FIG. 4. However, it should be understood that the application should not be limited to a particular type of device, except as specifically claimed.

Referring to FIG. 4, a perspective view of an exemplary GAA transistor 200 is illustrated. The GAA transistor 200 is formed over a substrate 202. The substrate 202 may contains a semiconductor material, such as bulk silicon (Si).

The GAA transistor 200 also includes one or more nanostructures 204 (dash lines) extending in the Y-direction and vertically stacked (or arranged) in the Z-direction. More specifically, the nanostructures 204 are spaced apart from each other in the Z-direction. In some embodiments, the nanostructures 204 may also be referred to as channels, channel layers, nanosheets, or nanowires.

The GAA transistor 200 further includes a gate structure 206 including a gate dielectric layer 208 and a gate electrode 210. The gate dielectric layer 208 wraps around the nanostructures 204 and the gate electrode 210 wraps around the gate dielectric layer 208 (not shown in FIG. 4, may refer to FIGS. 6G to 6I). As shown in FIG. 4, gate spacers 212 are on sidewalls of the gate structure 206 and over the nanostructures 204 (not shown in FIG. 4, may refer to FIGS. 6G and 6H). A gate top dielectric layer 214 is over the gate dielectric layer 208, the gate electrode 210, and the nanostructures 204. The gate top dielectric layer 214 is used for contact etch protection layer.

The GAA transistor 200 further includes source/drain features 216. As shown in FIG. 4, two source/drain features 216 are on opposite sides of the gate structure 206. The nanostructures 204 (dash lines) extends in the Y-direction to connect one source/drain feature 216 to the other source/drain feature 216. The source/drain features 216 may also be referred to as source/drain, or source/drain regions. In some embodiments, source/drain feature(s) may refer to a source or a drain, individually or collectively dependent upon the context.

Isolation feature 218 is over the substrate 202 and under the gate dielectric layer 208, the gate electrode 210, and the gate spacers 212. The isolation feature 218 is used for isolating the GAA transistor 200 from other devices. In some embodiments, the isolation feature 218 may include different structures, such as shallow trench isolation (STI) structure, deep trench isolation (DTI) structure. Therefore, the isolation feature 218 is also referred as to as a STI feature or DTI feature.

Figure 5:
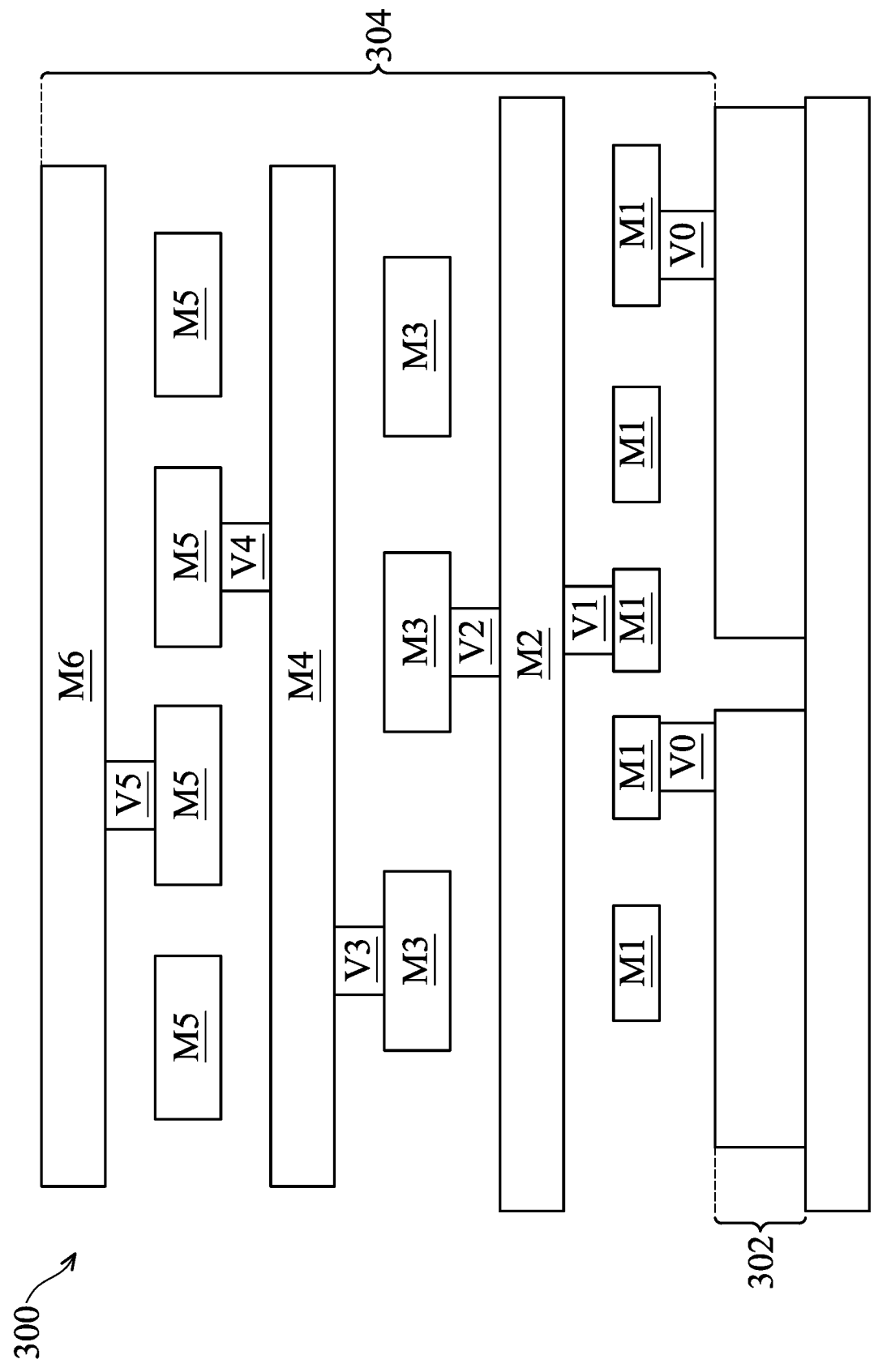
FIG. 5 is a cross sectional view of a memory device for illustrating an interconnection structure, in accordance with some embodiments of the present disclosure.

FIG. 5 is a cross sectional view of a memory device 300 for illustrating an interconnection structure, in accordance with some embodiments of the present disclosure. The memory device 300 has device region 302 (also referred to as a device layer) and an interconnection structure 304. The device region 302 is the region where the transistors and main features are located, such as gate, channel, source/drain, contact features, and the transistors (e.g., the transistors of the SRAM cells 100 and 100' discussed above) of the circuit cells discussed above. The interconnection structure 304 is over the device region 302 or at the front-side of the device region 302.

As shown in FIG. 5, the interconnection structure 304 includes metal layer M1, metal layer M2 over the metal layer M1, metal layer M3 over the metal layer M2, metal layer M4 over the metal layer M3, metal layer M5 over the metal layer M4, and metal layer M6 over the metal layer M5. Each of the metal layers M1, M2, M3, M4, M5, and M6 includes metal conductors. The interconnection structure 304 further includes vias V0, V1, V2, V3, V4, and V5 for connecting the metal conductor in the underlying metal layer to the metal conductor in the overlying metal layer. The vias and metal conductors electrically couple various transistors and/or components (for example, gate, source/drain features, resistors, capacitors, and/or inductors) in the device region 302, such that the various devices and/or components can operate as specified by the design requirements of circuit cells (e.g., logic cells and memory cells). It should be noted that there may be more vias and metal conductors for connections. In some embodiments, some of the vias V1 are connected to the gate structures (gate electrodes) of the transistors. Therefore, the vias V1 connected to the gate structures are also referred to as the gate vias. In some embodiments, the vias and metal conductors are used for the connections of the features of the transistor. In other embodiments, the vias and metal conductors are connected to voltage sources (the supply voltage VDD or the reference voltage VSS discussed above) to provide voltage to the transistors in the device region 302. Therefore, the metal conductors connected to the voltage sources may be also referred to as the voltage metal conductors, the voltage lines, or voltage conductors.

For the operation speed of the read-port (e.g., the read-port PG of the SRAM cell 100) of the three-port SRAM cell is major dominated by transistor on-current and bit-line capacitance, in the present disclosure, the read bit-lines are designed to be located in the lowest metal layer (i.e., the metal layer M1) to have lower capacitance (save metal landing pad capacitance if located at higher metal layers). Further, since the read word lines and the write word lines are more care about resistance, the read word lines and the write word lines are designed to be located in the higher metal layer for having larger width. Therefore, in some embodiments, the metal conductors serving as read bit-lines and VDD lines are designed to be located in the metal layer M1; the metal conductors serving as read word-lines for one read-port of the three-port SRAM cell are designed to be located in the metal layer M2; the metal conductors serving as write bit-lines and write bit-line-bars are designed to be located in the metal layer M3; the metal conductors serving as read word-lines for the other read-port of the three-port SRAM cell are designed to be located in the metal layer M4; and the metal conductors serving as write word-lines are designed to be located in the metal layer M6.

Figure 6A:
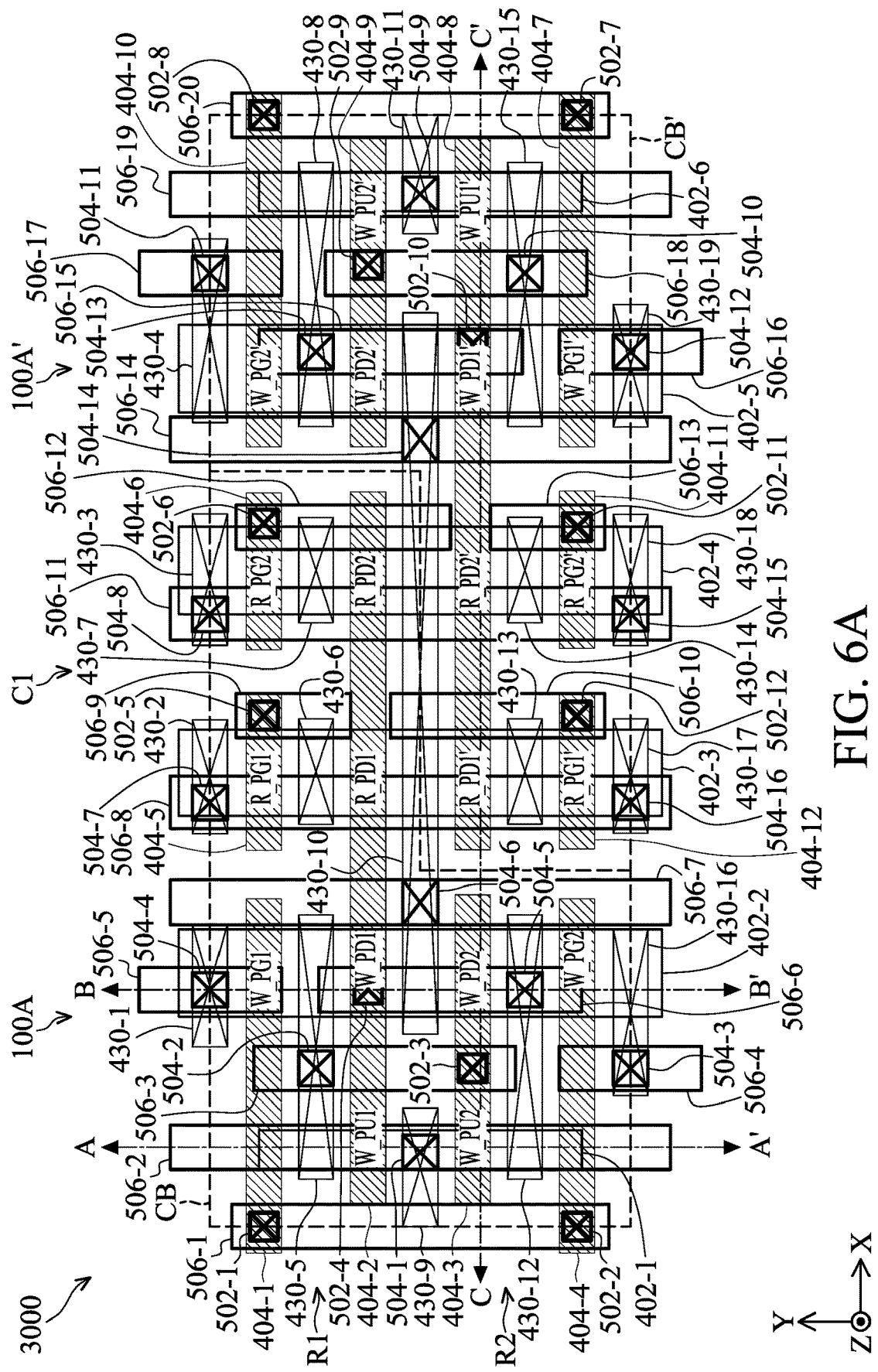
FIGS. 6A, 6B, 6C, 6D, 6E, and 6F are top views (or layouts) of two SRAM cells in adjacent two rows of an array in a portion of the array that can be one embodiment of three-port SRAM cells implemented in the memory region, in accordance with some embodiments of the present disclosure.
Figure 6B:
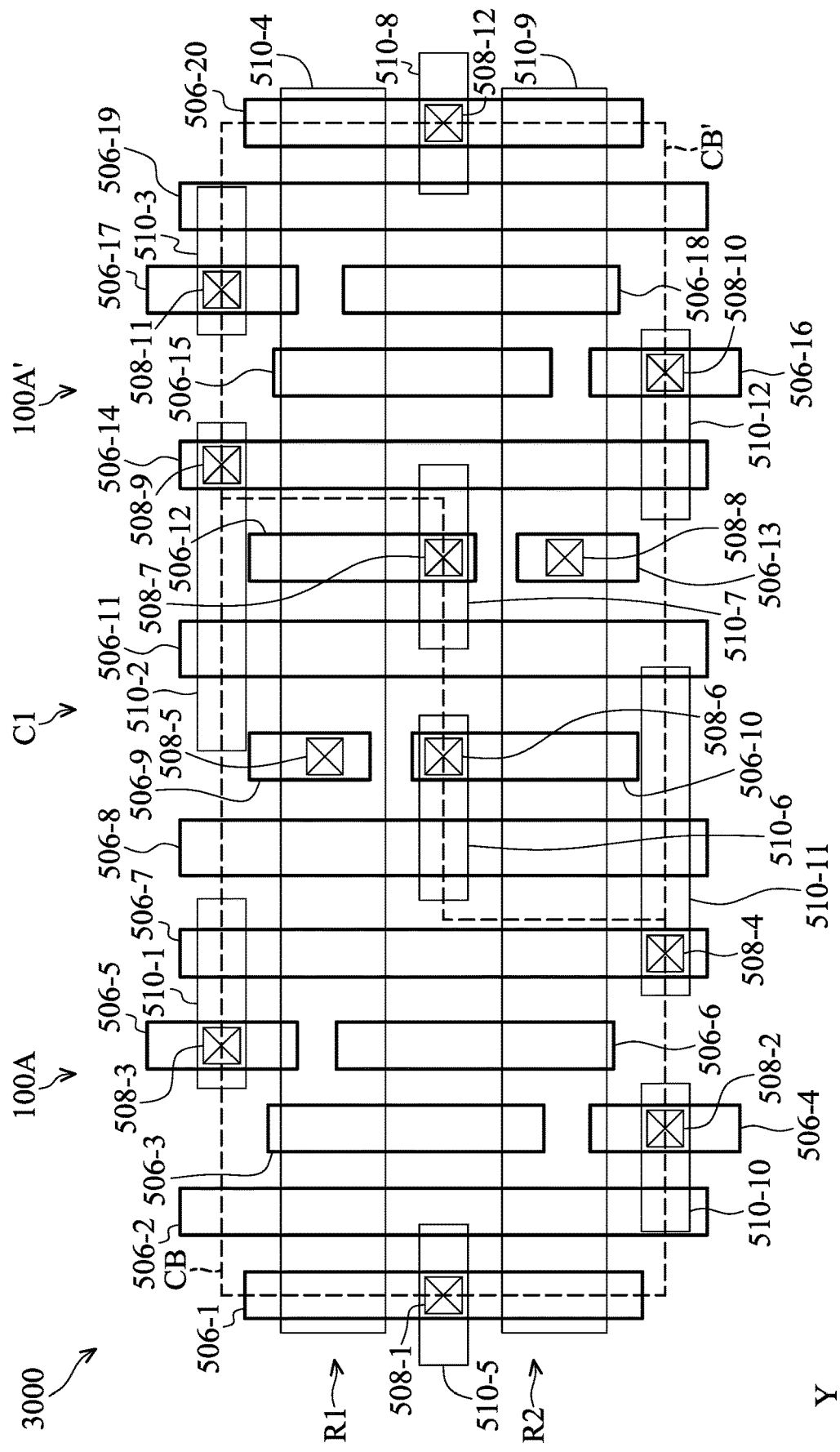
Figure 6C:
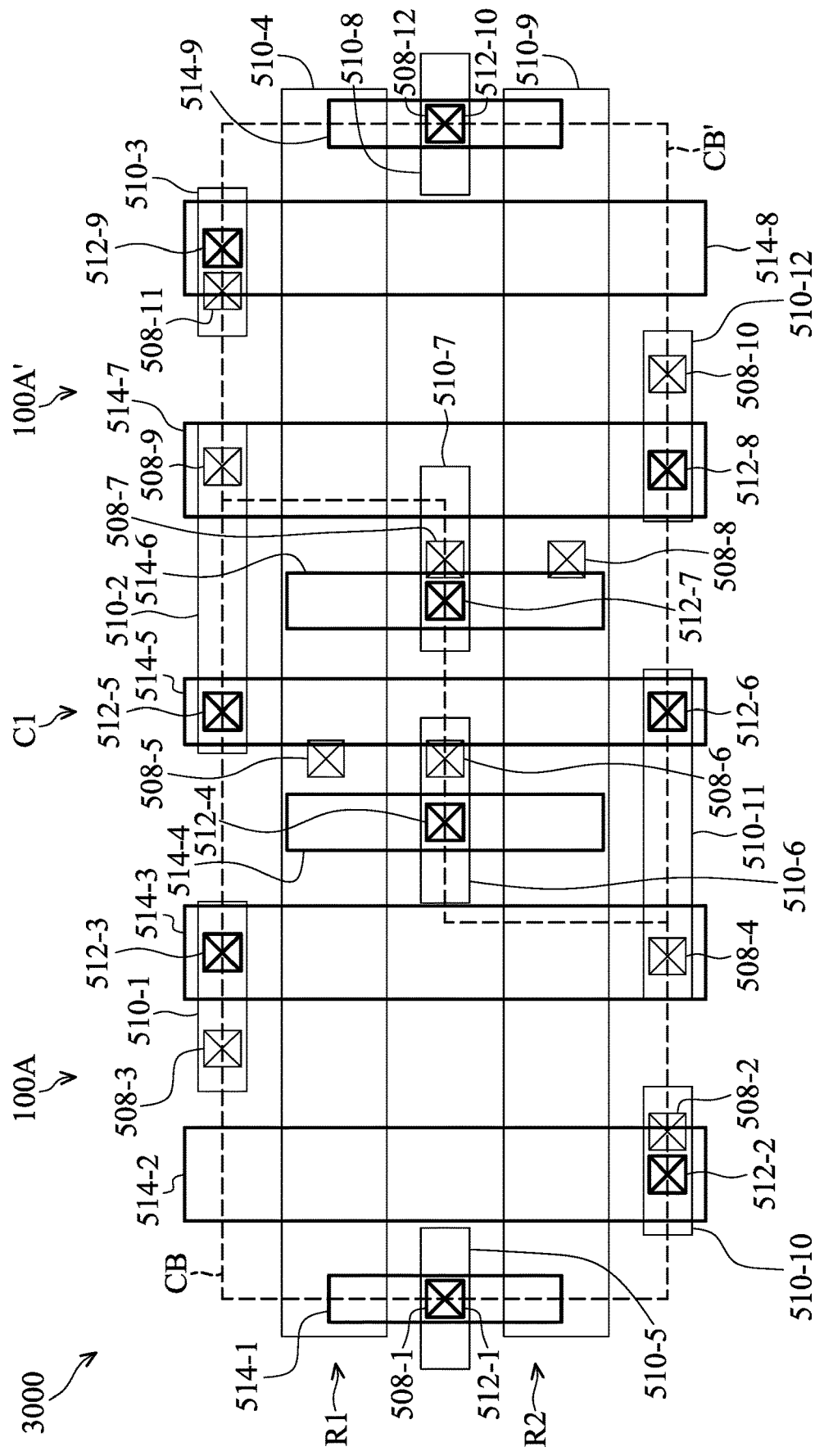
Figure 6D:
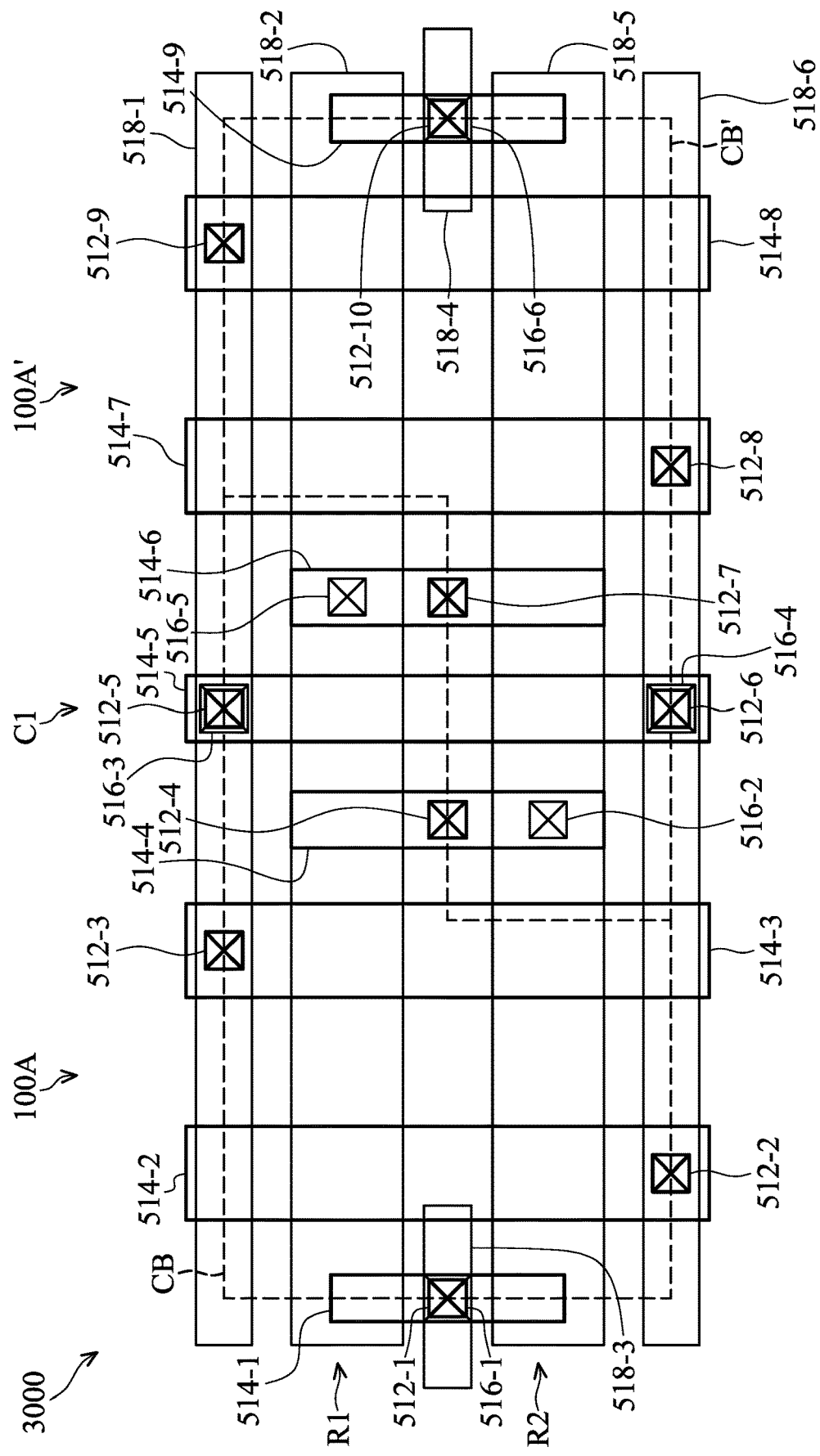
Figure 6E:
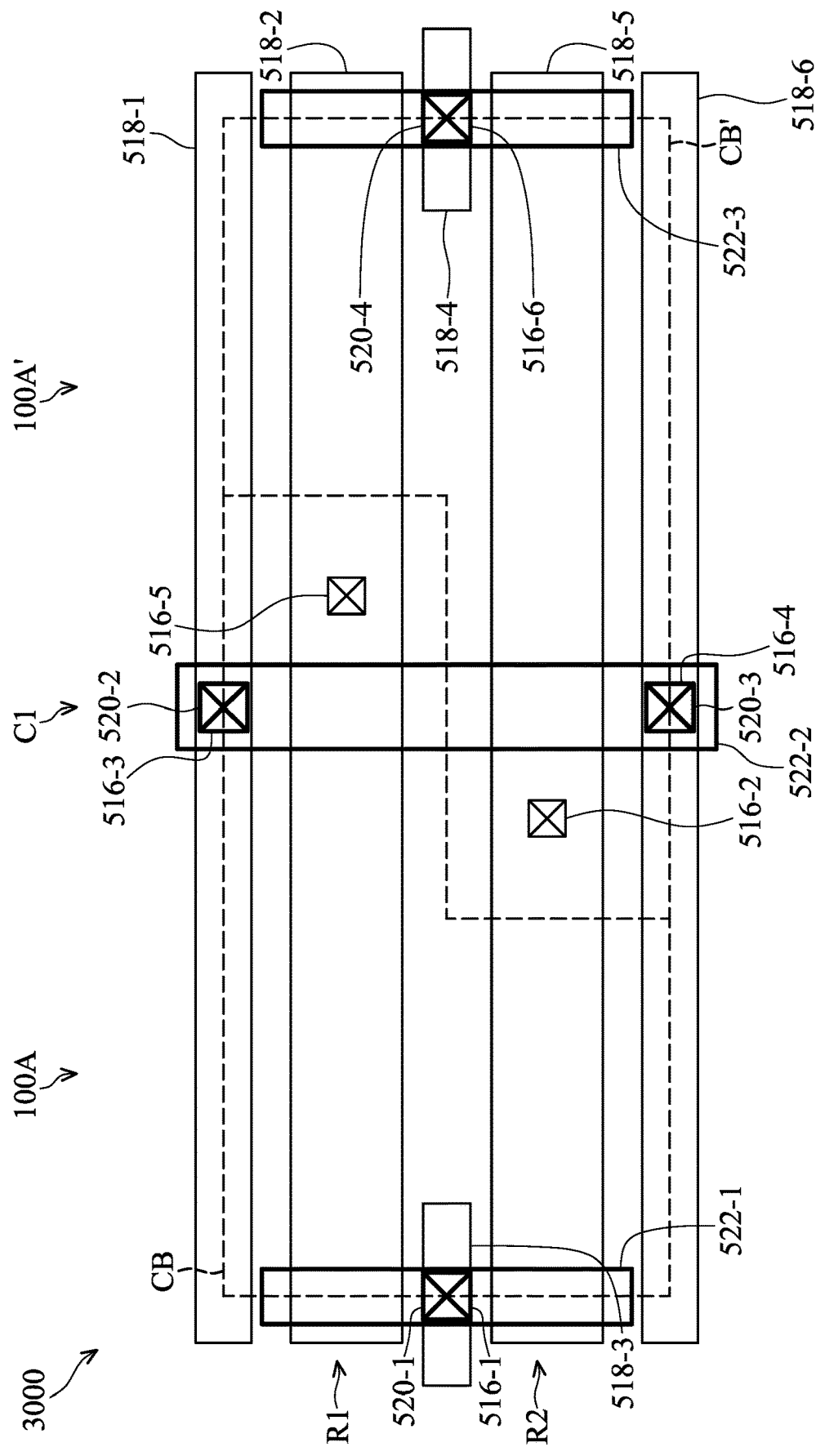
Figure 6F:
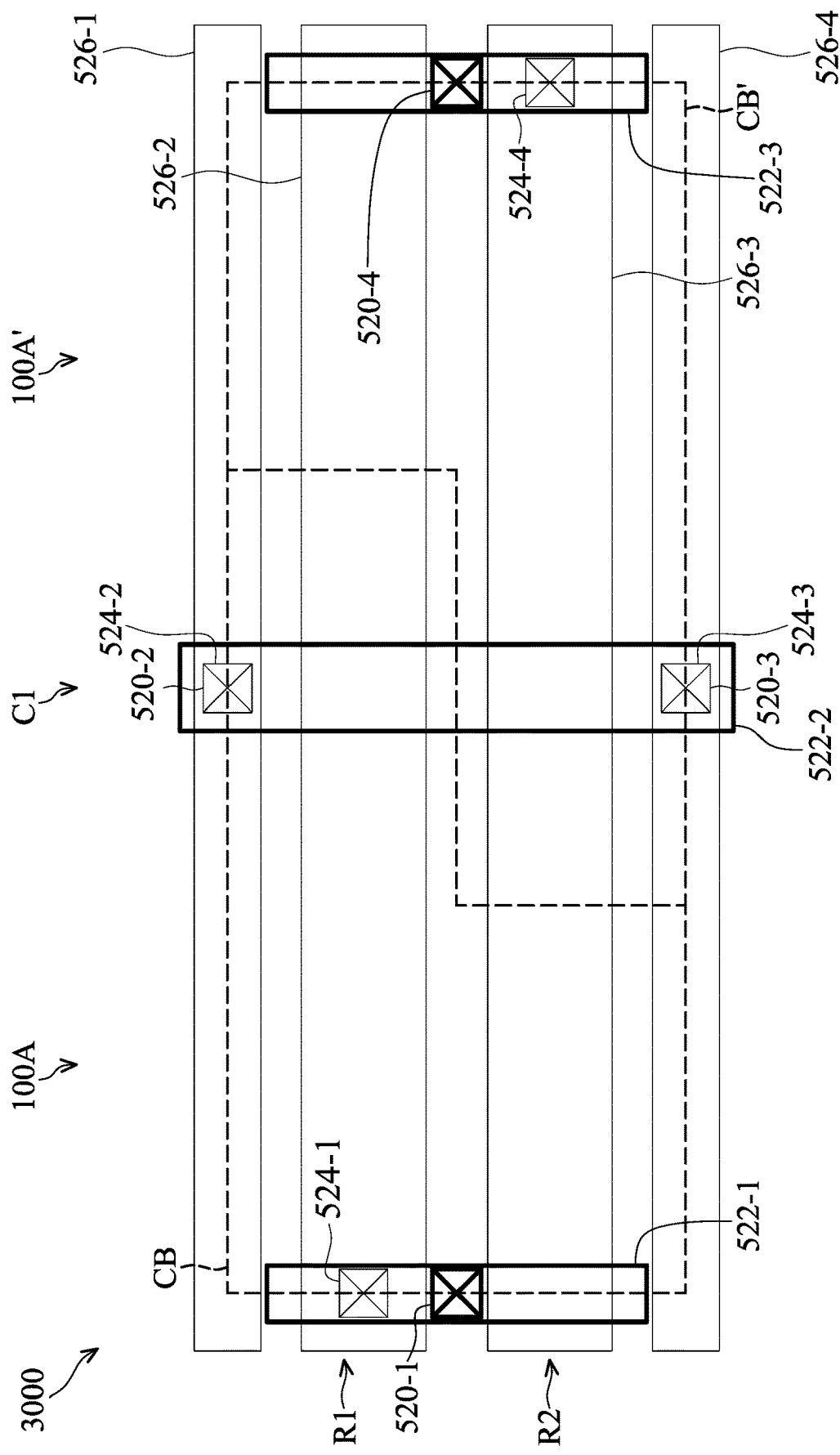
Figure 6G:
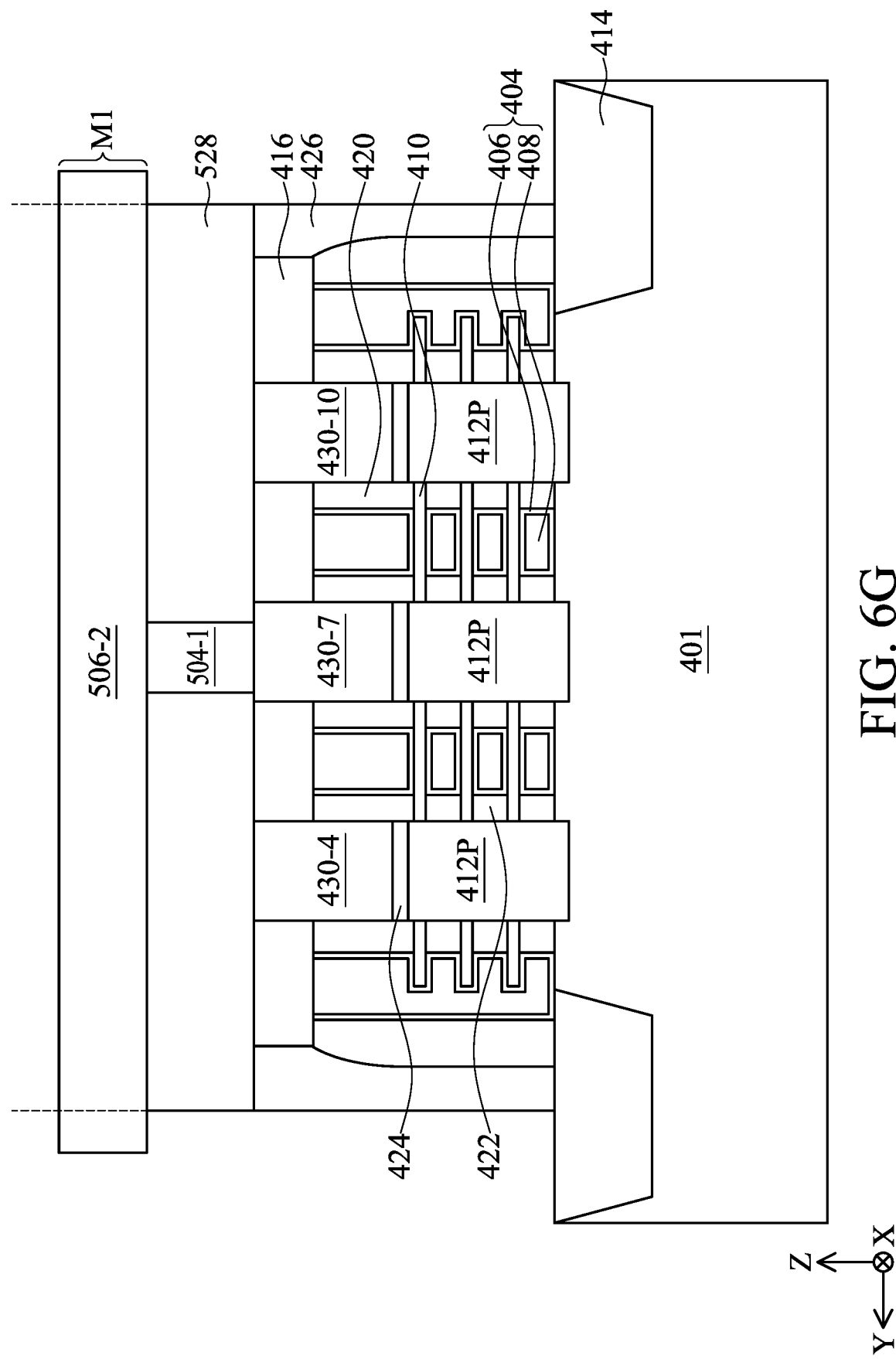
FIG. 6G is a cross-sectional view of the array along a line A-A' in FIG. 6A, in accordance with some embodiments of the present disclosure.
Figure 6H:
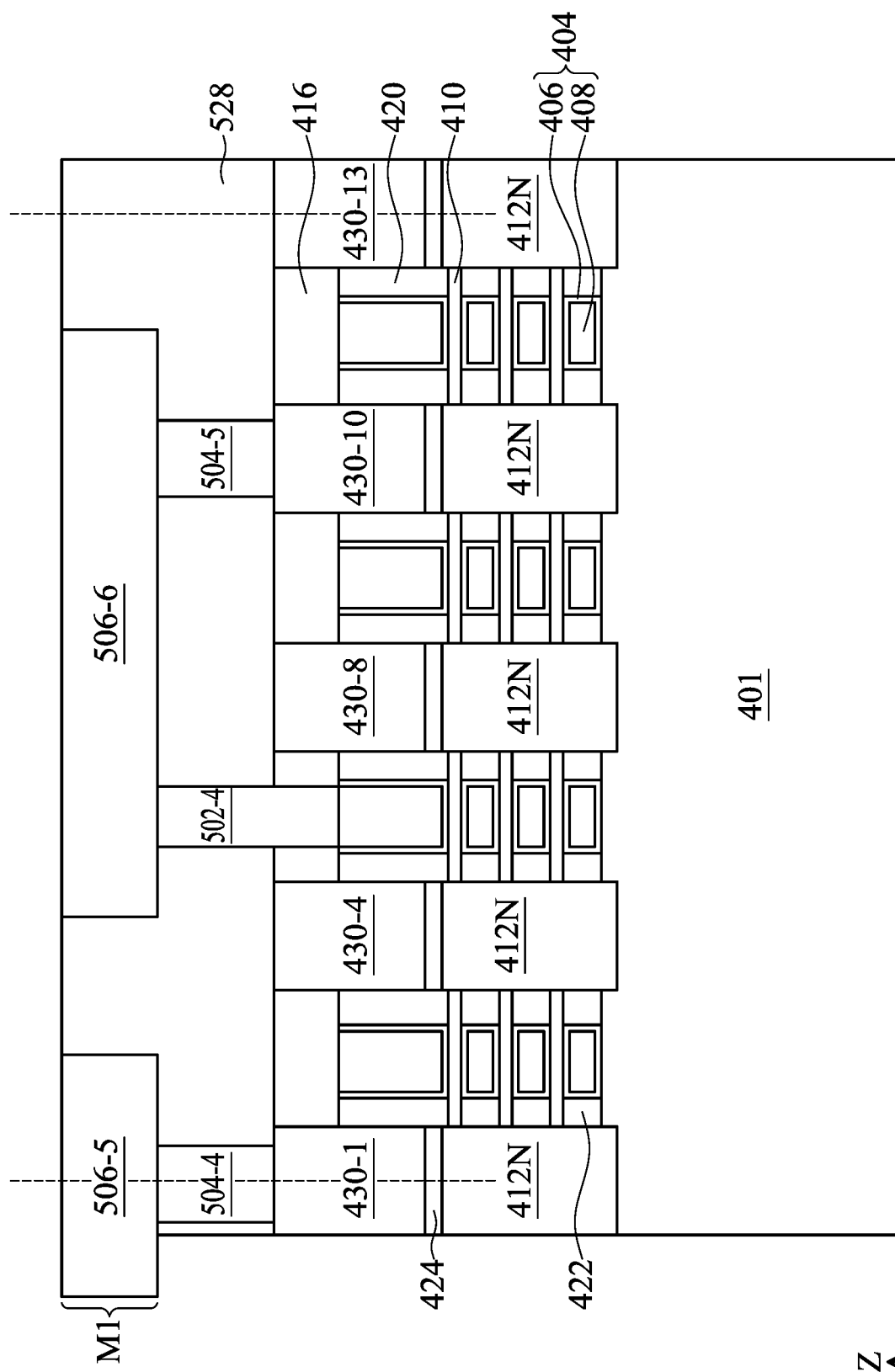
FIG. 6H is a cross-sectional view of the array along a line B-B' in FIG. 6A, in accordance with some embodiments of the present disclosure.
Figure 6I:
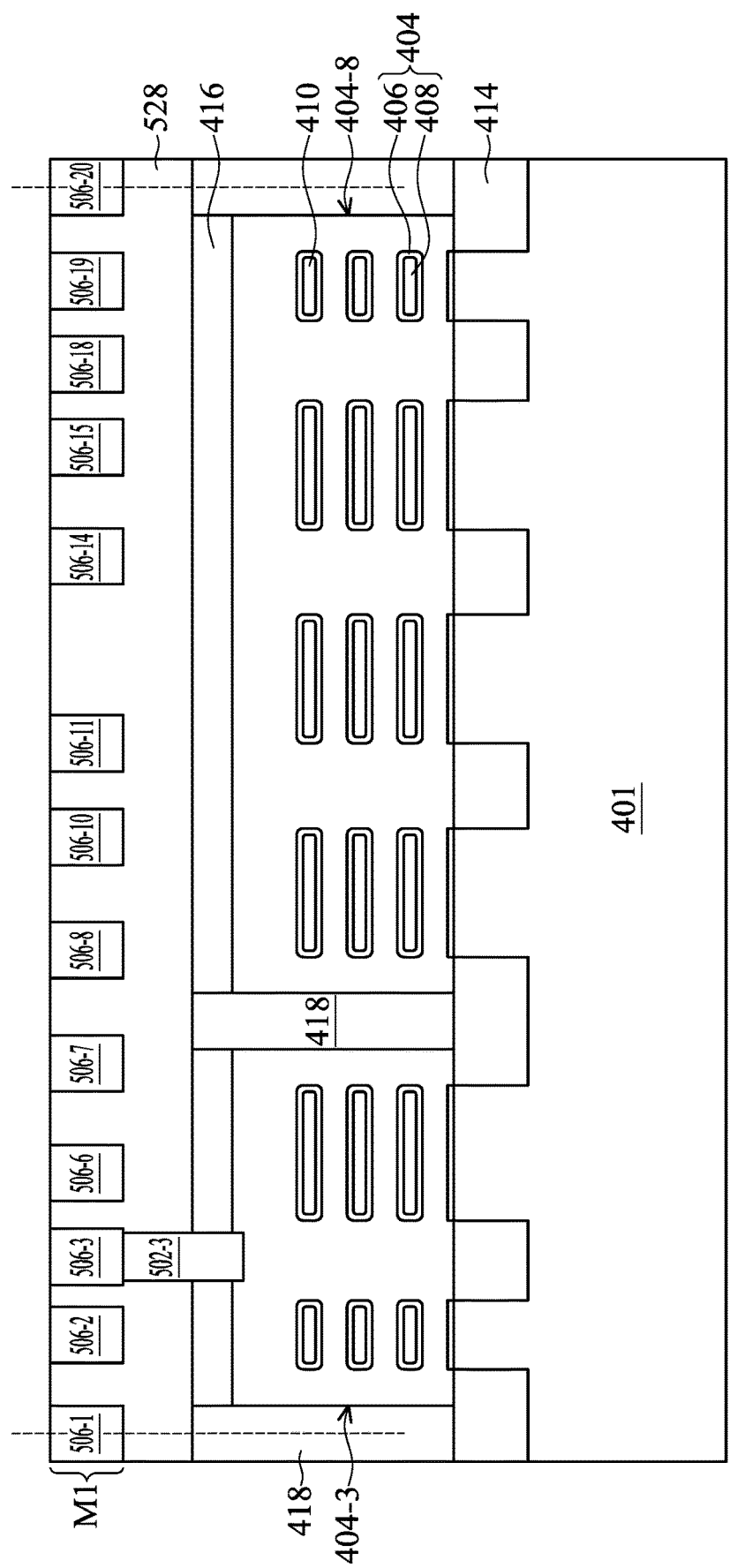
FIG. 6I is a cross-sectional view of the array along a line C-C' in FIG. 6A, in accordance with some embodiments of the present disclosure.

FIGS. 6A to 6F are top views (or layouts) of two SRAM cells 100A and 100A' in adjacent two rows of an array 3000 in a portion of the array 3000 that can be one embodiment of three-port SRAM cells 100 and 100' implemented in the memory region 20, in accordance with some embodiments of the present disclosure. FIG. 6A illustrates the features in the device region (including transistors), the metal conductors in the first metal layer (M1), and vias vertically between the features and the first metal layer (M1). FIG. 6B illustrates the metal conductors in the first metal layer (M1) and the second metal layer (M2), and vias vertically between the first metal layer (M1) and the second metal layer (M2). FIG. 6C illustrates the metal conductors in the second metal layer (M2) and the third metal layer (M3), vias vertically between the first metal layer (M1) and the second metal layer (M2), and vias vertically between the second metal layer (M2) and the third metal layer (M3). FIG. 6D illustrates the metal conductors in the third metal layer (M3) and the fourth metal layer (M4), vias vertically between the second metal layer (M2) and the third metal layer (M3), and vias vertically between the third metal layer (M3) and the fourth metal layer (M4). FIG. 6E illustrates the metal conductors in the fourth metal layer (M4) and the fifth metal layer (M5), vias vertically between the third metal layer (M3) and the fourth metal layer (M4), and vias vertically between the fourth metal layer (M4) and the fifth metal layer (M5). FIG. 6F illustrates the metal conductors in the fifth metal layer (M5) and the sixth metal layer (M6), vias vertically between the fourth metal layer (M4) and the fifth metal layer (M5), and vias vertically between the fifth metal layer (M5) and the sixth metal layer (M6). FIG. 6G is a cross sectional view of the array 3000 along a line A-A' in FIG. 6A, in accordance with some embodiments of the present disclosure. FIG. 6H is a cross sectional view of the array 3000 along a line B-B' in FIG. 6A, in accordance with some embodiments of the present disclosure. FIG. 6I is a cross sectional view of the array 3000 along a line C-C' in FIG. 6A, in accordance with some embodiments of the present disclosure. For the sake of simplicity, FIGS. 6G to 6I show the features in the device region, the metal conductors in the first metal layer (M1), and vias vertically between the features and the first metal layer (M1), while the vias and the metal conductors in higher metal layers (higher than the first metal layer (M1)) are omitted.

As shown in FIG. 6A to 6F, the array 3000 shows a row R1 having the SRAM cells 100A which is abutted and adjacent to the SRAM cells 100A' in a row R2. More specifically, the adjacent two SRAM cells 100A' and 100A' are respectively in the adjacent two rows R1 and R2, and are together in a column C1.

The SRAM cells 100A and 100A' each respectively has a cell boundary CB and a cell boundary CB'. The cell boundaries CB and CB' each has a non-rectangular shape (indicated by the dotted rectangular box) in the top view. The cell boundaries CB and CB' each is also asymmetric. More specifically, each of the cell boundaries CB and CB' is L-shaped in the top view (or an X-Y plane view), as shown in FIG. 6A to 6F. Therefore, in some embodiments, the cell boundaries CB and CB' may be referred to as non-rectangular cell boundaries, asymmetric cell boundaries, or L-shaped cell boundaries. The SRAM cells 100A and 100A' are abutted together, such that the cell boundaries CB and CB' are combined to form a rectangle, in which a dimension of the rectangle in the X-direction is greater than a dimension of the rectangle in the Y-direction, as shown in FIGS. 6A to 6F.

The array 3000 includes active areas, such as active areas 402-1 to 402-6, (may be collectively referred to as the active areas 402) that extend lengthwise in the Y-direction and are arranged in the X-direction. The active areas 402-1 and 402-2 are used for the SRAM cell 100A; the active areas 402-5 and 402-6 are used for the SRAM cell 100A'; and the active areas 402-3 and 402-4 are shared by the SRAM cells 100A and 100A'. Each of active areas 402 includes channel regions, source regions, and drain regions (where source regions and drain regions are collectively referred to as source/drain regions herein) of transistors. The array 3000 further includes gate structures, such as gate structures 404-1 to 404-12 (may be collectively referred to as the gate structures 404) that extend lengthwise in the X-direction. The X-direction and the Y-direction are perpendicular. The gate structures 404-1 to 404-12 are disposed over the channel regions of the respective active areas 402-1 to 402-6 (i.e., (vertically stacked) nanostructures 410) and disposed between respective source/drain regions of the active areas 402-1 to 402-6 (i.e., source/drain features 412N and 412P). In some embodiments, the gate structures 404-1 to 404-12 wrap and/or surround suspended, vertically stacked nanostructures 410 in the channel regions of the active areas 402-1 to 402-6, respectively (as shown in FIGS. 6G to 6I).

The gate structures engage the active areas to form the transistors of the three-port SRAM cell discussed above. In the SRAM cell 100A, the gate structure 404-1 extends across the active area 402-2 in the top view and engages the active area 402-2 to form the write-port PG transistor W_PG1; the gate structure 404-2 extends across the active areas 402-1 to 402-4 in the top view and engages the active area 402-1 to 402-4 to respectively form the write-port PU transistor W_PU1, the write-port PD transistor W_PD1, the read-port PD transistor R_PD1, and the read-port PD transistor R_PD2; the gate structure 404-3 extends across the active areas 402-1 and 402-2 in the top view and engages the active area 402-1 and 402-2 to respectively form the write-port PU transistor W_PU2 and the write-port PD transistor W_PD2; the gate structure 404-4 extends across the active area 402-2 in the top view and engages the active area 402-2 to form the write-port PG transistor W_PG2; the gate structure 404-5 extends across the active area 402-3 in the top view and engages the active area 402-3 to form the read-port PG transistor R_PG1; and the gate structure 404-6 extends across the active area 402-4 in the top view and engages the active area 402-4 to form the read-port PG transistor R_PG2.

In the SRAM cell 100A', the gate structure 404-7 extends across the active area 402-5 in the top view and engages the active area 402-5 to form the write-port PG transistor W_PG1'; the gate structure 404-8 extends across the active areas 402-3 to 402-6 in the top view and engages the active area 402-3 to 402-6 to respectively form the read-port PD transistor R_PD1', the read-port PD transistor R_PD2', the write-port PD transistor W_PD1', and the write-port PU transistor W_PU1'; the gate structure 404-9 extends across the active areas 402-5 and 402-6 in the top view and engages the active area 402-5 and 402-6 to respectively form the write-port PD transistor W_PD2' and the write-port PU transistor W_PU2'; the gate structure 404-10 extends across the active area 402-5 in the top view and engages the active area 402-5 to form the write-port PG transistor W_PG2'; the gate structure 404-11 extends across the active area 402-4 in the top view and engages the active area 402-4 to form the read-port PG transistor R_PG2'; and the gate structure 404-12 extends across the active area 402-3 in the top view and engages the active area 402-3 to form the read-port PG transistor R_PG1'.

As shown in FIG. 6A, the write-port PU transistor W_PU1 and the write-port PU transistor W_PU2 are arranged in the Y-direction and share the active area 402-1; the write-port PG transistor W_PG1, the write-port PD transistor W_PD1, the write-port PD transistor W_PD2, and the write-port PG transistor W_PG2 are arranged in the Y-direction and share the active area 402-2; the read-port PG transistor R_PG1, the read-port PD transistor R_PD1, the read-port PD transistor R_PD1', and the read-port PG transistor R_PG1' are arranged in the Y-direction and share the active area 402-3; the read-port PG transistor R_PG2, the read-port PD transistor R_PD2, the read-port PD transistor R_PD2', and the read-port PG transistor R_PG2' are arranged in the Y-direction and share the active area 402-4; the write-port PG transistor W_PG1', the write-port PD transistor W_PD1', the write-port PD transistor W_PD2', and the write-port PG transistor W_PG2' are arranged in the Y-direction and share the active area 402-5; and the write-port PU transistor W_PU1' and the write-port PU transistor W_PU2' are arranged in the Y-direction and share the active area 402-6.

Further, in the SRAM cell 100A, the write-port PU transistor W_PU1, the write-port PD transistor W_PD1, the read-port PD transistor R_PD1, and the read-port PD transistor R_PD2 share the gate structure 404-2; and the write-port PU transistor W_PU2 and the write-port PD transistor W_PD2 share the gate structure 404-3. In the SRAM cell 100A', the write-port PU transistor W_PU1', the write-port PD transistor W_PD1', the read-port PD transistor R_PD2', and the read-port PD transistor R_PD1' share the gate structure 404-8; and the write-port PU transistor W_PU2' and the write-port PD transistor W_PD2' share the gate structure 404-9.

Similar to the substrate 202 discussed above, the array 3000 further includes substrate 401, over which the various features are formed, such as the gate structures 404-1 to 404-12. The substrate 401 may contains a semiconductor material, such as bulk silicon (Si). In some other embodiments, the substrate 401 may include other semiconductors such as germanium (Ge), silicon germanium (SiGe), or a III-V semiconductor material. Example III-V semiconductor materials may include gallium arsenide (GaAs), indium phosphide (InP), gallium phosphide (GaP), gallium nitride (GaN), gallium arsenide phosphide (GaAsP), aluminum indium arsenide (AlInAs), aluminum gallium arsenide (AlGaAs), gallium indium phosphide (GaInP), and indium gallium arsenide (InGaAs). Alternatively, the substrate 401 may be a semiconductor-on-insulator substrate, such as a silicon-on-insulator (SOI) substrate, a silicon germanium-on-insulator (SGOI) substrate, or a germanium-on-insulator (GOI) substrate. Semiconductor-on-insulator substrates may be fabricated using separation by implantation of oxygen (SIMOX), wafer bonding, and/or other suitable methods . . . .

Similar to the isolation feature 218 discussed above, the array 3000 further includes an isolation feature (or isolation structure) 414. The isolation feature 414 may include silicon oxide, silicon nitride, silicon oxynitride, other suitable isolation material (for example, including silicon, oxygen, nitrogen, carbon, or other suitable isolation constituent), or combinations thereof. The isolation feature 414 may include different structures, such as shallow trench isolation (STI) structures, deep trench isolation (DTI) structures, and/or local oxidation of silicon (LOCOS) structures. In some embodiments, STI features include a multi-layer structure that fills the trenches, such as a silicon nitride comprising layer disposed over a thermal oxide comprising liner layer. In another example, STI features include a dielectric layer disposed over a doped liner layer (including, for example, boron silicate glass (BSG) or phosphosilicate glass (PSG)). In yet another example, STI features include a bulk dielectric layer disposed over a liner dielectric layer, where the bulk dielectric layer and the liner dielectric layer include materials depending on design requirements.

Each of the transistors in the SRAM cell 100A (e.g., the write-port PG transistors W_PG1 and W_PG2, the write-port PD transistors W_PD1 and W_PD2, the write-port PU transistors W_PU1 and W_PU2, the read-port PG transistors R_PG1 and R_PG2, and the read-port PD transistors R_PD1 and R_PD2) and the transistors in the SRAM cell 100A' (e.g., the write-port PG transistors W_PG1' and W_PG2', the write-port PD transistors W_PD1' and W_PD2', the write-port PU transistors W_PU1' and W_PU2', the read-port PG transistors R_PG1' and R_PG2', and the read-port PD transistors R_PD1' and R_PD2') includes nanostructures 410 similar to the nanostructures 204 discussed above. As shown in FIGS. 6G to 6I, the nanostructures 410 are suspended. In some embodiments, three nanostructures 410 are vertically stacked (or vertically arranged) from each other in the Z-direction for one transistor. However, there may be another appropriate number of nanostructures in one transistor. For example, there may be from 2 to 6 nanostructures 410 in one transistor. The nanostructures 410 further extend lengthwise in the Y-direction (FIGS. 6G and 6H) and widthwise in the X-direction (FIG. 6I). In some embodiments, a width of the nanostructures 410 in the active areas 402-2 to 402-5 in the X-direction is greater than a width of the nanostructures 410 in the active areas 402-1 and 402-6, as shown in FIGS. 6A and 6I. As shown in FIG. 6I, in each of the transistors in the SRAM cell 100A and 100A', three nanostructures 410 are spaced apart from each other in the Z-direction.

The nanostructures 410 may include a semiconductor material, such as silicon, germanium, silicon carbide, silicon phosphide, gallium arsenide, gallium phosphide, indium phosphide, indium arsenide, and/or indium antimonide, silicon germanium (SiGe), SiPC, GaAsP, AlInAs, AlGaAs, GaInAs, GaInP, and/or GaInAsP. In some embodiments, the nanostructures 410 include silicon for n-type transistors, such as the write-port PD transistors W_PD1, W_PD2, W_PD1', and W_PD2', the write-port PG transistors W_PG1, W_PG2, W_PG1', and W_PG2', the read-port PD transistors R_PD1, R_PD2, R_PD1', and R_PD2', and the read-port PG transistors R_PG1, R_PG2, R_PG1', and R_PG2'. In other embodiments, the nanostructures 410 include silicon germanium for p-type transistors, such as the write-port PU transistors W_PU1, W_PU2, W_PU1', and W_PU2'. In some embodiments, the nanostructures 410 are all made of silicon, and the type of the transistors depend on work function metal layer wrapping around the nanostructures 410. In some embodiments, the nanostructures 410 are epitaxially grown using a deposition technique such as epitaxial growth, vapor-phase epitaxy (VPE), molecular beam epitaxy (MBE), although other deposition processes, such as chemical vapor deposition (CVD), low pressure CVD (LPCVD), atomic layer deposition (ALD), ultrahigh vacuum CVD (UHVCVD), reduced pressure CVD (RPCVD), a combination thereof, or the like, may also be utilized.

Each of the gate structures 404-1 to 404-12 has a gate dielectric layer 406 and a gate electrode layer 408. The gate dielectric layers 406 wrap around each of the nanostructures 410 and the gate electrodes layer 408 wrap around the gate dielectric layer 406. In some embodiments, the gate structures 404 each further includes an interfacial layer (such as having silicon dioxide, silicon oxynitride, or other suitable materials) between the gate dielectric layer 406 and the nanostructures 410. The gate dielectric layers 406 may include oxide with nitrogen doped dielectric material (initial layer) combined with metal content high-K dielectric material (K value (dielectric constant)>13). For example, gate dielectric layers 406 may include hafnium oxide (HfO$_2$), which has a dielectric constant in a range from about 18 to about 40. Alternatively, the gate dielectric layers 406 may include other high-K dielectrics, such as TiO$_2$, HfZrO, Ta$_2$O$_3$, HfSiO$_4$, ZrO$_2$, ZrSiO$_2$, LaO, AlO, ZrO, TiO, Ta$_2$Os, Y$_2$O$_3$, SrTiO$_3$(STO), BaTiO$_3$(BTO), BaZrO, HfLaO, HfSiO, LaSiO, AlSiO, HfTaO, HfTiO, (Ba,Sr) TiO$_3$(BST), Al$_2$O$_3$, Si$_3$N$_4$, oxynitrides (SiON), combinations thereof, or other suitable material. The gate dielectric layers 406 may be formed by chemical oxidation, thermal oxidation, ALD, CVD, and/or other suitable methods.

The gate electrode layer 408 is formed to wrap around the gate dielectric layer 406 and the center portions of the nanostructures 410, as shown in FIGS. 6G and 6H. In some embodiments, the gate electrode layer 408 may include an n-type work function metal layer for n-type transistor (such as write-port PD transistors W_PD1, W_PD2, W_PD1', and W_PD2', the write-port PG transistors W_PG1, W_PG2, W_PG1', and W_PG2', the read-port PD transistors R_PD1, R_PD2, R_PD1', and R_PD2', and the read-port PG transistors R_PG1, R_PG2, R_PG1', and R_PG2') or a p-type work function metal layer for p-type transistor (such as the write-port PU transistors W_PU1, W_PU2, W_PU1', and W_PU2'). In an embodiment, the n-type work function metal layer is a material such as Ti, Al, Ag, Mn, Zr, TiAl, TiAlC, TaC, TaCN, TaSiN, TaAl, TaAlC, TiAlN, other suitable n-type work function materials, or combinations thereof. For example, the n-type work function metal layer may be deposited utilizing ALD, CVD, or the like. However, any suitable materials and processes may be utilized to form the n-type work function metal layer. In an embodiment, the p-type work function metal layer is a material such as TIN, TaN, Ru, Mo, Al, WN, ZrSi$_2$, MoSi$_2$, TaSi$_2$, NiSi$_2$, WN, other metal oxides, metal nitrides, metal silicates, transition metal-oxides, transition metal-nitrides, transition metal-silicates, oxynitrides of metals, metal aluminates, zirconium silicate, zirconium aluminate, other suitable p-type work function materials, combinations of these, or the like. Additionally, the p-type work function metal layer may be deposited using a deposition process such as ALD, CVD, or the like, although any suitable deposition process may be used.

In some embodiments, the gate electrode layer 408 may include a single layer or alternatively a multi-layer structure. In some embodiments, the gate electrode layer 408 may further include a capping layer, a barrier layer, and a fill material (not shown). The capping layer may be formed adjacent to the gate dielectric layers 406 and may be formed from a metallic material such as TaN, Ti, TiAlN, TiAl, Pt, TaC, TaCN, TaSiN, Mn, Zr, TiN, Ru, Mo, WN, other metal oxides, metal nitrides, metal silicates, transition metal-oxides, transition metal-nitrides, transition metal-silicates, oxynitrides of metals, metal aluminates, zirconium silicate, zirconium aluminate, combinations of these, or the like. The metallic material may be deposited using a deposition process such as ALD, CVD, or the like, although any suitable deposition process may be used. The barrier layer may be formed adjacent the capping layer, and may be formed of a material different from the capping layer. For example, the barrier layer may be formed of a material such as one or more layers of a metallic material such as TiN, TaN, Ti, TiAlN, TiAl, Pt, TaC, TaCN, TaSiN, Mn, Zr, Ru, Mo, WN, other metal oxides, metal nitrides, metal silicates, transition metal-oxides, transition metal-nitrides, transition metal-silicates, oxynitrides of metals, metal aluminates, zirconium silicate, zirconium aluminate, combinations of these, or the like. The barrier layer may be deposited using a deposition process such as atomic layer deposition, chemical vapor deposition, or the like, although any suitable deposition process may be used.

The SRAM cells 100A and 100A' further include gate top dielectric layers 416 are over the gate dielectric layers 406, the gate electrodes 408, and the nanostructures 410. The gate top dielectric layers 416 are similar to the gate top dielectric layer 214 discussed above. The gate top dielectric layer 416 is used for contact etch protection layer. The material of gate top dielectric layer 416 is selected from a group consisting of oxide, SiOC, SiON, SiOCN, nitride base dielectric, metal oxide dielectric, Hf oxide (HfO$_2$), Ta oxide (Ta$_2$O$_5$), Ti oxide (TiO$_2$), Zr oxide (ZrO$_2$), Al oxide (Al$_2$O$_3$), Y oxide (Y$_2$O$_3$), combinations thereof, or other suitable material.

As shown in FIG. 6I, gate end dielectrics 418 are at ends of the gate structures 404. The gate end dielectrics 418 are used for separating the gate structures 404 aligned in the X-direction. For example, the gate end dielectrics 418 separate the gate structures 404-3 and 404-8, as shown in FIG. 6I. The material of the gate end dielectrics 418 is selected from a group consisting of Si$_3$N$_4$, nitride-base dielectric, carbon-base dielectric, high K material (K>=9), or a combination thereof.

The SRAM cells 100A and 100A' further include gate spacers 420 on sidewalls of the gate structures 404 and over the nanostructures 410, as shown in FIGS. 6G and 6H. More specifically, the gate spacers 420 are over the nanostructures 410 and on top sidewalls of the gate structures 404, and thus are also referred to as gate top spacers or top spacers. The gate spacers 420 may include multiple dielectric materials and be selected from a group consisting of silicon nitride (Si$_3$N$_4$), silicon oxide (SiO$_2$), silicon carbide (SiC), silicon oxycarbide (SiOC), silicon oxynitride (SiON), silicon oxycarbon nitride (SiOCN), carbon doped oxide, nitrogen doped oxide, porous oxide, air gap, or a combination thereof. In some embodiments, the gate spacers 420 may include a single layer or a multi-layer structure.

As shown in FIGS. 6G and 6H, the SRAM cells 100A and 100A' further include inner spacers 422 on the sidewalls of the gate structures 404 and below the topmost nanostructures 410. Furthermore, the inner spacers 422 are laterally between the source/drain features 412N (or 412P) and the gate structures 404. The inner spacers 422 are also vertically between adjacent nanostructures 410. The inner spacers 422 may include a dielectric material having higher K value (dielectric constant) than the gate spacers 420 and be selected from a group consisting of silicon nitride (Si$_3$N$_4$), silicon oxide (SiO$_2$), silicon carbide (SiC), silicon oxycarbide (SiOC), silicon oxynitride (SiON), silicon oxycarbon nitride (SiOCN), air gap, or a combination thereof. In some embodiments, the thickness of the gate spacers 420 in the Y-direction and the thickness of the inner spacers 422 in the Y-direction are the same. In other embodiments, the thickness of the gate spacers 420 in the Y-direction is less than the thickness of the inner spacers 422 in the Y-direction due to the gate spacers 420 are trimmed during processes for forming source/drain contacts.

Referring to FIGS. 6G and 6H, the SRAM cells 100A and 100A' further include source/drain features 412N and source/drain features 412P in the source/drain regions of the active areas 402. The source/drain features 412N are disposed over both sides of the respective gate structure 404 and connected by the nanostructures 410 to form n-type transistor (e.g., the write-port PD transistors W_PD1, W_PD2, W_PD1', and W_PD2', the write-port PG transistors W_PG1, W_PG2, W_PG1', and W_PG2', the read-port PD transistors R_PD1, R_PD2, R_PD1', and R_PD2', and the read-port PG transistors R_PG1, R_PG2, R_PG1', and R_PG2'). Similarly, the source/drain features 412P are disposed over both sides of the respective gate structure 404 and connected by the nanostructures 410 to form p-type transistor (e.g., the write-port PU transistors W_PU1, W_PU2, W_PU1', and W_PU2'). Further, every two adjacent transistors in the Y direction share one source/drain feature 412N/412P, as shown in FIGS. 6A, 6G, and 6H.

The source/drain features 412N and 412P may be formed by using epitaxial growth. In some embodiments, the source/drain features 412N may include epitaxially-grown material selected from a group consisting of SiP, SiC, SiPC, SiAs, Si, or a combination thereof. In some embodiments, the epitaxially-grown material of the source/drain features 412N may be doped with n-type dopants (such as phosphorus, arsenic, other n-type dopant, or combinations thereof) having a doping concentration in a range from about $2\times10^{19}/cm^3$ to $3\times10^{21}/cm^3$. In some embodiments, the source/drain features 412N for n-type transistors may be respectively referred to as n-type features and n-type source/drain features.

In some embodiments, the source/drain features 412P may include epitaxially-grown material selected from a group consisting of boron-doped SiGe, boron-doped SiGeC, boron-doped Ge, boron-doped Si, boron and carbon doped SiGe, or a combination thereof. In some embodiments, the epitaxially-grown material of the source/drain features 412P may be doped with p-type dopants (such as boron, indium, other p-type dopant, or combinations thereof) having a doping concentration in a range from about $1\times10^{19}/cm^3$ to $6\times10^{20}/cm^3$. In some embodiments, the source/drain features 412P for p-type transistors may be respectively referred to as p-type source/drain features.

As shown in FIGS. 5E and 5F, the SRAM cells 100A and 100A' further include silicide features 424 over the source/drain features 412N and 412P. The silicide features 424 may include titanium silicide (TiSi), nickel silicide (NiSi), tungsten silicide (WSi), nickel-platinum silicide (NiPtSi), nickel-platinum-germanium silicide (NiPtGeSi), nickel-germanium silicide (NiGeSi), ytterbium silicide (YbSi), platinum silicide (PtSi), iridium silicide (IrSi), erbium silicide (ErSi), cobalt silicide (CoSi), or other suitable compounds.

Referring to FIGS. 6A, 6G, and 6H, the SRAM cells 100A and 100A' further include source/drain contacts 430-1 to 430-19 (may be collectively referred to as the source/drain contacts 430) in an inter-layer dielectric (ILD) layer 426. As shown in FIGS. 6A, 6G, and 6H, the source/drain contacts 430 extend lengthwise in the X-direction. The source/drain contacts 430 are self-aligned source/drain contacts. This means that the source/drain contacts 430 are formed by using the gate spacers 420 as mask. Therefore, the source/drain contacts 430 are in direct contact with the gate spacers 420, as shown in FIGS. 6G and 6H. In some embodiments, the gate spacers 420 are trimmed due to the gate spacers 420 serving as the mask for forming the source/drain contacts 430. Therefore, the thickness of the gate spacers 420 in the Y-direction is less than the thickness of the inner spacers 422 in the Y-direction, as discussed above.

In the top view, as shown in FIG. 6A, the source/drain contacts 430-1, 430-2, 430-3, and 430-16 lengthwise overlap the cell boundary CB, the source/drain contacts 430-34, 430-17, 430-18, and 430-19 lengthwise overlap the cell boundary CB', and the source/drain contact 430-10 lengthwise overlap the cell boundaries CB and CB'.

In the top view, the source/drain contact 430-1 is adjacent to the gate structure 404-1 (or is adjacent to the write-port PG transistor W_PG1) in the Y-direction; the source/drain contact 430-2 is adjacent to the gate structure 404-5 (or is adjacent to the read-port PG transistor R_PG1) in the Y-direction; the source/drain contact 430-3 is adjacent to the gate structure 404-6 (or is adjacent to the read-port PG transistor R_PG2) in the Y-direction; the source/drain contact 430-4 is adjacent to the gate structure 404-10 (or is adjacent to the write-port PG transistor W_PG2') in the Y-direction; the source/drain contact 430-5 is between the gate structures 404-1 and 404-2 (or between the write-port PG transistor W_PG1 and the write-port PD transistor W_PD1) in the Y-direction; the source/drain contact 430-6 is between the gate structures 404-5 and 404-2 (or between the read-port PG transistor R_PG1 and the read-port PD transistor R_PD1) in the Y-direction; the source/drain contact 430-7 is between the gate structures 404-6 and 404-2 (or between the read-port PG transistor R_PG2 and the read-port PD transistor R_PD2) in the Y-direction; the source/drain contact 430-8 is between the gate structures 404-10 and 404-9 (or between the write-port PG transistor W_PG2' and the write-port PD transistor W_PD2') in the Y-direction; the source/drain contact 430-9 is between the gate structures 404-2 and 404-3 (or between the write-port PU transistors W_PU1 and W_PU2) in the Y-direction; the source/drain contact 430-10 is between the gate structures 404-2 and 404-3, between the gate structures 404-2 and 404-8, and between the gate structures 404-9 and 404-8 (or between the write-port PD transistors W_PD1 and W_PD2, between the read-port PD transistors R_PD1 and R_PD1', between the read-port PD transistors R_PD2 and R_PD2', and between the write-port PD transistors W_PD2' and W_PD1') in the Y-direction; the source/drain contact 430-11 is between the gate structures 404-9 and 404-8 (or between the write-port PU transistors W_PU2' and W_PU1') in the Y-direction; the source/drain contact 430-12 is between the gate structures 404-3 and 404-4 (or between the write-port PD transistor W_PD2 and the write-port PG transistor W_PG2) in the Y-direction; the source/drain contact 430-13 is between the gate structures 404-8 and 404-12 (or between the read-port PD transistor R_PD1' and the read-port PG transistor R_PG1') in the Y-direction; the source/drain contact 430-14 is between the gate structures 404-8 and 404-11 (or between the read-port PD transistor R_PD2' and the read-port PG transistor R_PG2') in the Y-direction; the source/drain contact 430-15 is between the gate structures 404-8 and 404-7 (or between the write-port PD transistor W_PD1' and the write-port PG transistor W_PG1') in the Y-direction; the source/drain contact 430-16 is adjacent to the gate structure 404-4 (or is adjacent to the write-port PG transistor W_PG2) in the Y-direction; the source/drain contact 430-17 is adjacent to the gate structure 404-12 (or is adjacent to the read-port PG transistor R_PG1') in the Y-direction; the source/drain contact 430-18 is adjacent to the gate structure 404-11 (or is adjacent to the read-port PG transistor R_PG2') in the Y-direction; and the source/drain contact 430-19 is adjacent to the gate structure 404-7 (or is adjacent to the write-port PG transistor W_PG1') in the Y-direction.

Furthermore, each of the source/drain contacts 430 is over and electrically connected to the respective source/drain features 412N/412P. Specifically, as shown in FIGS. 6A, 6G, and 6H, the source/drain contact 430-1 is over and electrically connected to the source/drain feature 412N of the write-port PG transistor W_PG1; the source/drain contact 430-2 is over and electrically connected to the source/drain feature 412N of the read-port PG transistor R_PG1; the source/drain contact 430-3 is over and electrically connected to the source/drain feature 412N of the read-port PG transistor R_PG2; the source/drain contact 430-4 is over and electrically connected to the source/drain feature 412N of the write-port PG transistor W_PG2'; the source/drain contact 430-5 is over and electrically connected to the source/drain feature 412N shared by the write-port PG transistor W_PG1 and the write-port PD transistor W_PD1 (also referred to as common source/drain or common drain) and the source/drain feature 412P of the write-port PU transistor W_PU1, which corresponds to the data node ND shown in FIG. 3; the source/drain contact 430-6 is over and electrically connected to the source/drain feature 412N shared by the read-port PG transistor R_PG1 and the read-port PD transistor R_PD1; the source/drain contact 430-7 is over and electrically connected to the source/drain feature 412N shared by the read-port PG transistor R_PG2 and the read-port PD transistor R_PD2; the source/drain contact 430-8 is over and electrically connected to the source/drain feature 412N shared by the write-port PG transistor W_PG2' and the write-port PD transistor W_PD2' (also referred to as common source/drain or common drain) and the source/drain feature 412P of the write-port PU transistor W_PU2', which corresponds to the data node NDB' shown in FIG. 3; the source/drain contact 430-9 is over and electrically connected to the source/drain feature 412P shared by the write-port PU transistors W_PU1 and W_PU2; the source/drain contact 430-10 is over and electrically connected to the source/drain feature 412N shared by the write-port PD transistor W_PD1 and W_PD2, the source/drain feature 412N shared by the read-port PD transistors R_PD1 and R_PD1', the source/drain feature 412N shared by the read-port PD transistors R_PD2 and R_PD2', and the source/drain feature 412N shared by the write-port PD transistor W_PD1' and W_PD2'; the source/drain contact 430-11 is over and electrically connected to the source/drain feature 412P shared by the write-port PU transistors W_PU1' and W_PU2'; the source/drain contact 430-12 is over and electrically connected to the source/drain feature 412N shared by the write-port PG transistor W_PG2 and the write-port PD transistor W_PD2 (also referred to as common source/drain or common drain) and the source/drain feature 412P of the write-port PU transistor W_PU2, which corresponds to the data node NDB shown in FIG. 3; the source/drain contact 430-13 is over and electrically connected to the source/drain feature 412N shared by the read-port PG transistor R_PG1' and the read-port PD transistor R_PD1'; the source/drain contact 430-14 is over and electrically connected to the source/drain feature 412N shared by the read-port PG transistor R_PG2' and the read-port PD transistor R_PD2'; the source/drain contact 430-15 is over and electrically connected to the source/drain feature 412N shared by the write-port PG transistor W_PG1' and the write-port PD transistor W_PD1' (also referred to as common source/drain or common drain) and the source/drain feature 412P of the write-port PU transistor W_PU1', which corresponds to the data node ND' shown in FIG. 3; the source/drain contact 430-16 is over and electrically connected to the source/drain feature 412N of the write-port PG transistor W_PG2; the source/drain contact 430-17 is over and electrically connected to the source/drain feature 412N of the read-port PG transistor R_PG1'; the source/drain contact 430-18 is over and electrically connected to the source/drain feature 412N of the read-port PG transistor R_PG2'; and the source/drain contact 430-19 is over and electrically connected to the source/drain feature 412N of the write-port PG transistor W_PG1'.

The source/drain contacts 430 may each include a conductive material such as Al, Cu, W, Co, Ti, Ta, Ru, Rh, Ir, Pt, TiN, TiAl, TiAlN, TaN, TaC, combinations of these, or the like, although any suitable material may be deposited using a deposition process such as sputtering, CVD, electroplating, electroless plating, or the like. In some embodiments, the source/drain contacts 430 may each include a single conductive material layer or multiple conductive layers.

As shown in FIGS. 6A to 6I, the SRAM cells 100A and 100A' further include gate vias 502 (including gate vias 502-1 to 502-12), vias 504 (including vias 504-1 to 504-16), metal conductors 506 (including metal conductors 506-1 to 506-20), vias 508 (including vias 508-1 to 508-12), metal conductors 510 (including metal conductors 510-1 to 510-12), vias 512 (including vias 512-1 to 512-10), metal conductors 514 (including metal conductors 514-1 to 514-9), vias 516 (including vias 516-1 to 516-6), metal conductors 518 (including metal conductors 518-1 to 518-6), vias 520 (including vias 520-1 to 520-4), metal conductors 522 (including metal conductors 522-1 to 522-3), vias 524 (including vias 524-1 to 524-4), metal conductors 526 (including metal conductors 526-1 to 526-4), and an inter-metal dielectric (IMD) layer 528, which are over the transistors in the SRAM cells 100A and 100A' (e.g., the write-port PG transistors W_PG1, W_PG2, W_PG1', and W_PG2', the write-port PD transistors W_PD1, W_PD2, W_PD1', and W_PD2', the write-port PU transistors W_PU1, W_PU2, W_PU1', and W_PU2', the read-port PG transistors R_PG1, R_PG2, R_PG1', and R_PG2', and the read-port PD transistors R_PD1, R_PD2, R_PD1' and R_PD2').

The gate vias 502, the vias 504, 508, 512, 516, 520, and 524, and the metal conductors 506, 510, 514, 518, 522, and 526 are in the IMD layer 528. The metal conductors 506, 510, 514, 518, 522, and 526 are respectively in the metal layers M1, M2, M3, M4, M5, and M6, as discussed above. Therefore, the metal conductors 510 are over the metal conductors 506, the metal conductors 514 are over the metal conductors 510, the metal conductors 518 are over the metal conductors 514, the metal conductors 522 are over the metal conductors 518, and the metal conductors 526 are over the metal conductors 522. As show in FIGS. 6A to 6F, the metal conductors 506, 514, and 522 extend lengthwise in the Y-direction, and the metal conductors 510, 518, and 526 extend lengthwise in the X-direction.

Each of the gate vias 502 is vertically between and electrically connected to the respective gate structure 404 and the respective metal conductor 506. Each of the vias 504 is vertically between and electrically connected to the respective source/drain contact 430 and the respective metal conductor 506. Each of the vias 508 is vertically between and electrically connected to the respective metal conductor 506 and the respective metal conductor 510. Each of the vias 512 is vertically between and electrically connected to the respective metal conductor 510 and the respective metal conductor 514. Each of the vias 516 is vertically between and electrically connected to the respective metal conductor 514 and the respective metal conductor 518. Each of the vias 520 is vertically between and electrically connected to the respective metal conductor 518 and the respective metal conductor 522. Each of the vias 524 is vertically between and electrically connected to the respective metal conductor 522 and the respective metal conductor 526. In some embodiments, the gate vias 502, the vias 504, 508, 512, 516, 520, and 524 may have a square shape in the top view. In other embodiments, gate vias 502, the vias 504, 508, 512, 516, 520, and 524 may have a circular shape in the top view.

As discussed above, connections of the SRAM cells 100A and 100A' correspond to the circuit of the SRAM cells 100 and 100' shown in FIG. 3. In some embodiments, the metal conductors 506-8 and 506-11 respectively serve as the read bit-lines RBL1 and RBL2 discussed above that shared by the SRAM cells 100A and 100A'. More specifically, the metal conductor 506-8 serving as the read bit-line RBL1 is shared by the read-port PG transistors R_PG1 and R_PG1' and the metal conductor 506-11 serving as the read bit-line RBL2 is shared by the read-port PG transistors R_PG2 and R_PG2'

As shown in FIG. 6A, the metal conductor 506-8 is over the read-port PG transistors R_PG1 and R_PG1' and the read-port PD transistors R_PD1 and R_PD1'. The metal conductor 506-11 is over the read-port PG transistors R_PG2 and R_PG2' and the read-port PD transistors R_PD2 and R_PD2'. In some embodiments, in the top view, the metal conductor 506-8 overlaps the active are 402-3 in the Y-direction and the metal conductor 506-11 overlaps the active are 402-4 in the Y-direction.

The metal conductor 506-8 is electrically connected to the source/drain feature 412N of the read-port PG transistor R_PG1 through the via 504-7 and the source/drain contact 430-2 and electrically connected to the source/drain feature 412N of the read-port PG transistor R_PG1' through the via 504-16 and the source/drain contact 430-17. The metal conductor 506-11 is electrically connected to the source/drain feature 412N of the read-port PG transistor R_PG2 through the via 504-8 and the source/drain contact 430-3 and electrically connected to the source/drain feature 412N of the read-port PG transistor R_PG2' through the via 504-15 and the source/drain contact 430-18. As shown in FIG. 6A, in the top view, the vias 504-7 and 504-8 overlap the cell boundary CB, and the vias 504-15 and 504-16 overlap the cell boundary CB'. In some embodiments, the metal conductors 506-8 and 506-11 may be referred to as read bit-line conductor.

In some embodiments, the metal conductors 506-2 and 506-19 serve as VDD lines that are electrically coupled to a voltage source (not shown) (e.g., the supply voltage VDD discussed above) and electrically connected to the source/drain features of the write-port PU transistors W_PU1, W_PU2, W_PU1', and W_PU2'. As shown in FIG. 6A, the metal conductor 506-2 is over the write-port PU transistors W_PU1 and W_PU2, and the metal conductor 506-19 is over the write-port PU transistors W_PU1' and W_PU2'. In some embodiments, the metal conductor 506-2 overlaps the active are 402-1 in the Y-direction and in the top view, and the metal conductor 506-19 overlaps the active are 402-6 in the Y-direction and in the top view.

As shown in FIG. 6A, for the SRAM cell 100A, the metal conductor 506-2 is electrically connected to the source/drain feature 412P shared by the write-port PU transistors W_PU1 and W_PU2 through the via 504-1 and the source/drain contact 430-9. For the SRAM cell 100A', the metal conductor 506-19 is electrically connected to the source/drain feature 412P shared by the write-port PU transistors W_PU1' and W_PU2' through the via 504-9 and the source/drain contact 430-11. In some embodiments, the metal conductors 506-2 and 506-19 may be referred to as the VDD conductors or the VDD lines.

In some embodiments, the metal conductors 506-3, 506-18, 506-6, and 506-15 also respective serve as data node ND, ND', NDB, and NDB' as discussed above. In the top view, as shown in FIG. 6A, the metal conductor 506-3 is across the gate structures 404-2 and 404-3 and the source/drain contact 430-5; the metal conductor 506-6 is across the gate structures 404-2 and 404-3 and the source/drain contact 430-12; the metal conductor 506-15 is across the gate structures 404-8 and 404-9 and the source/drain contact 430-8; and the metal conductor 506-18 is across the gate structures 404-8 and 404-9 and the source/drain contact 430-15.

As shown in FIG. 6A, for the SRAM cell 100A, the metal conductor 506-3 is electrically connected to the source/drain contact 430-5 (thus also electrically connected to the source/drain feature 412N shared by the write-port PG transistor W_PG1 and the write-port PD transistor W_PD1 and the source/drain feature 412P of the write-port PU transistor W_PU1) through the via 504-2 and the gate structure 404-3 through the gate via 502-3; the metal conductor 506-6 is electrically connected to the source/drain contact 430-12 (thus also electrically connected to the source/drain feature 412N shared by the write-port PG transistor W_PG2 and the write-port PD transistor W_PD2 and the source/drain feature 412P of the write-port PU transistor W_PU2) through the via 504-5 and the gate structure 404-2 through the gate via 502-4.

For the SRAM cell 100A', the metal conductor 506-18 is electrically connected to the source/drain contact 430-15 (thus also electrically connected to the source/drain feature 412N shared by the write-port PG transistor W_PG1' and the write-port PD transistor W_PD1' and the source/drain feature 412P of the write-port PU transistor W_PU1') through the via 504-10 and the gate structure 404-9 through the gate via 502-9; the metal conductor 506-15 is electrically connected to the source/drain contact 430-8 (thus also electrically connected to the source/drain feature 412N shared by the write-port PG transistor W_PG2' and the write-port PD transistor W_PD2' and the source/drain feature 412P of the write-port PU transistor W_PU2') through the via 504-13 and the gate structure 404-8 through the gate via 502-10.

Since the metal conductor 506-3 is connected to the source/drain contact 430-5 that corresponds to the data node ND, the metal conductor 506-18 is connected to the source/drain contact 430-15 that corresponds to the data node ND', the metal conductor 506-6 is connected to the source/drain contact 430-12 that corresponds to the data node NDB, and the metal conductor 506-15 is connected to the source/drain contact 430-8 that corresponds to the data node NDB', the metal conductors 506-3, 506-18, 506-6, and 506-15 may also be referred to as data node lines or data node conductors.

In some embodiments, the metal conductors 510-4 and 510-9 respectively serve as the read word-lines RWL1 and RWL2' discussed above that controls and electrically connected to the gate structures (more specifically, the gate electrodes) of the read-port PG transistors R_PG1 and R_PG2'. As shown in FIGS. 6A and 5B, for the SRAM cell 100A, the metal conductor 510-4 is electrically connected to the gate structure 404-5 of the read-port PG transistor R_PG1 through the via 508-5, the metal conductor 506-9, and the gate via 502-5. For the SRAM cell 100A', the metal conductor 510-9 is electrically connected to the gate structure 404-11 of the read-port PG transistor R_PG2' through the via 508-8, the metal conductor 506-13, and the gate via 502-11. In some embodiments, the metal conductors 510-4 and 510-9 may be referred to as read word-line conductor. In some embodiments, the metal conductors 506-9 and 506-13 may be referred to as read word-line landing pads.

In some embodiments, the metal conductors 514-3, 514-2, 514-7, and 514-8 respectively serve as the write bit-line WBL, the write bit-line-bar WBLB, the write bit-line WBL', and the write bit-line-bar WBLB' discussed above that electrically connected to the source/drain features of the write-port PG transistors W_PG1, W_PG2, W_PG1', and W_PG2'. As shown in FIGS. 6A to 6C, for the SRAM cell 100A, the metal conductor 514-3 is electrically connected to the source/drain feature 412N of the write-port PG transistor W_PG1 through the via 512-3, the metal conductor 510-1, the via 508-3, the metal conductor 506-5, the via 504-4, and the source/drain contact 430-1; and the metal conductor 514-2 is electrically connected to the source/drain feature 412N of the write-port PG transistor W_PG2 through the via 512-2, the metal conductor 510-10, the via 508-2, the metal conductor 506-4, the via 504-3, and the source/drain contact 430-16.

For the SRAM cell 100A', the metal conductor 514-7 is electrically connected to the source/drain feature 412N of the write-port PG transistor W_PG1' through the via 512-8, the metal conductor 510-12, the via 508-10, the metal conductor 506-16, the via 504-12, and the source/drain contact 430-19; and the metal conductor 514-8 is electrically connected to the source/drain feature 412N of the write-port PG transistor W_PG2' through the via 512-9, the metal conductor 510-3, the via 508-11, the metal conductor 506-17, the via 504-11, and the source/drain contact 430-4.

As shown in FIGS. 6A to 6C, in the top view, the vias 512-2, 512-3, 508-2, 508-3, 504-3, 504-4 overlap the cell boundary CB, and the vias 512-8, 512-9, 508-10, 508-11, 504-11, 504-12 overlap the cell boundary CB'. Furthermore, in the top view, the metal conductors 510-1, 510-10 lengthwise overlap the cell boundary CB and the metal conductors 510-3, 510-12 lengthwise overlap the cell boundary CB'. In some embodiments, the metal conductors 514-3 and 514-7 may be referred to as write bit-line conductors, and the metal conductors 514-2 and 514-8 may be referred to as write bit-line-bar conductors. In some embodiments, the metal conductors 510-1, 510-12, 506-5, and 506-16 may be referred to as write bit-line landing pads, and the metal conductors 510-3, 510-10, 506-4, and 506-17 may be referred to as write bit-line-bar landing pads.

In some embodiments, the metal conductors 518-2 and 518-5 respectively serve as the read word-lines RWL2 and RWL1' discussed above that controls and electrically connected to the gate structures (more specifically, the gate electrodes) of the read-port PG transistors R_PG2 and R_PG1'. As shown in FIGS. 6A to 6D, for the SRAM cell 100A, the metal conductor 518-2 is electrically connected to the gate structure 404-6 of the read-port PG transistor R_PG2 through the via 516-5, the metal conductor 514-6, the via 512-7, the metal conductor 510-7, the via 508-7, the metal conductor 506-12, and the gate via 502-6. For the SRAM cell 100A', the metal conductor 518-4 is electrically connected to the gate structure 404-12 of the read-port PG transistor R_PG1' through the via 516-2, the metal conductor 514-4, the via 512-4, the metal conductor 510-6, the via 508-6, the metal conductor 506-10, and the gate via 502-12. In some embodiments, the metal conductors 518-2 and 518-5 may be referred to as read word-line conductor. In some embodiments, the metal conductors 514-6, 514-4, 510-7, 510-6, 506-12, and 506-10 may be referred to as read word-line landing pads.

In some embodiments, the metal conductors 526-2 and 526-3 respectively serve as the write word-lines WWL and WWL' discussed above that controls and electrically connected to the gate structures (more specifically, the gate electrodes) of the write-port PG transistors W_PG1, W_PG2, W_PG1', and W_PG2'. As shown in FIGS. 6A to 6F, for the SRAM cell 100A, the metal conductor 526-2 is electrically connected to the gate structure 404-1 of the write-port PG transistor W_PG1 through the via 524-1, the metal conductor 522-1, the via 520-1, the metal conductor 518-3, the via 516-1, the metal conductor 514-1, the via 512-1, the metal conductor 510-5, the via 508-1, the metal conductor 506-1, and the gate via 502-1, and is electrically connected to the gate structure 404-4 of the write-port PG transistor W_PG2 through the via 524-1, the metal conductor 522-1, the via 520-1, the metal conductor 518-3, the via 516-1, the metal conductor 514-1, the via 512-1, the metal conductor 510-5, the via 508-1, the metal conductor 506-1, and the gate via 502-2. For the SRAM cell 100A', the metal conductor 526-3 is electrically connected to the gate structure 404-7 of the write-port PG transistor W_PG1' through the via 524-4, the metal conductor 522-3, the via 520-4, the metal conductor 518-4, the via 516-6, the metal conductor 514-9, the via 512-10, the metal conductor 510-8, the via 508-12, the metal conductor 506-20, and the gate via 502-7, and is electrically connected to the gate structure 404-10 of the write-port PG transistor W_PG2' through the via 524-4, the metal conductor 522-3, the via 520-4, the metal conductor 518-4, the via 516-6, the metal conductor 514-9, the via 512-10, the metal conductor 510-8, the via 508-12, the metal conductor 506-20, and the gate via 502-8.

As shown in FIGS. 6A to 6F, in the top view, the vias 508-1, 512-1, 516-1, 520-1, 524-1 and the gate vias 502-1 and 502-2 overlap the cell boundary CB, and the vias 508-12, 512-10, 516-6, 520-4, 524-4 and the gate vias 502-7 and 502-8 overlap the cell boundary CB'. The vias 512-1 and 512-10 are directly over and overlap the vias 508-1 and 508-12; the vias 516-1, 516-3, 516-4, and 516-6 are directly over and overlap the vias 512-1, 512-5, 512-6, and 512-10; and the vias 520-1, 520-2, 520-3, and 520-4 are directly over and overlap the vias 516-1, 516-3, 516-4, and 516-6. Furthermore, in the top view, the metal conductors 506-1, 514-1, and 522-1 lengthwise overlap the cell boundary CB and the metal conductors 506-20, 514-9, and 522-3 lengthwise overlap the cell boundary CB'. In some embodiments, the metal conductors 526-2 and 526-3 may be referred to as write word-line conductors. In some embodiments, the metal conductors 506-1, 506-20, 510-5, 510-8, 514-1, 514-9, 518-3, 518-4, 522-1, and 522-3 may be referred to as write word-line landing pads.

The metal conductors 506-7, 506-14, 514-5, 518-1, 518-6, 522-2, 526-1, and 526-4 serve as VSS lines that are coupled together, electrically coupled to a voltage source (not shown) (e.g., the reference voltage VSS discussed above), and electrically connected to the source/drain features of the write-port PD transistors W_PD1, W_PD2, WPD1', and W_PD2' and the read-port PD transistors R_PD1, R_PD2, RPD1', and R_PD2'. As shown in FIG. 6A, the metal conductor 506-7 and 506-14 are electrically connected to the source/drain feature 412N shared by the write-port PD transistor W_PD1 and W_PD2, the source/drain feature 412N shared by the read-port PD transistors R_PD1 and R_PD1', the source/drain feature 412N shared by the read-port PD transistors R_PD2 and R_PD2', and the source/drain feature 412N shared by the write-port PD transistor W_PD1' and W_PD2' through the via 504-6, 504-14 and the source/drain contact 430-10.

As shown in FIGS. 6A to 6C, the metal conductor 514-5 is electrically connected to the metal conductor 506-7 through the via 512-6, the metal conductor 510-11, and the via 508-4, and is electrically connected to the metal conductor 506-14 through the via 512-5, the metal conductor 510-2, the via 508-9. As shown in FIG. 6D, the metal conductor 518-1 is electrically connected to the metal conductor 514-5 through the via 516-3, and the metal conductor 518-6 is electrically connected to the metal conductor 514-5 through the via 516-4. As shown in FIG. 6E, the metal conductor 522-2 is electrically connected to the metal conductor 518-1 through the via 520-2, and is electrically connected to the metal conductor 518-6 through the via 520-3. As shown in FIG. 6F, the metal conductor 526-1 is electrically connected to the metal conductor 522-2 through the via 524-2, and the metal conductor 526-4 is electrically connected to the metal conductor 522-2 through the via 524-3. In some embodiments, the metal conductors 510-2 and 510-11 serve as and are referred to as VSS local connections. As such, the metal conductors 506-7, 506-14, 510-2, 510-11, 514-5, 518-1, 518-6, 522-2, 526-1, and 526-4 and vias 504-6, 504-14, 508-4, 508-9, 512-5, 512-6, 516-3, 516-4, 520-2, 520-3, 524-2, and 524-3 may construct a power mesh to supply the reference voltage VSS to the write-port PD transistors and the read-port PD transistors.

As shown in FIGS. 6A to 6F, in the top view, the via 508-4, 512-5, 516-3, 520-2, and 524-2 overlap the cell boundary CB, and the vias 508-9, 512-6, 516-4, 520-3, and 524-3 overlap the cell boundary CB'. Furthermore, in the top view, the metal conductors 510-2, 510-11, 518-1, 518-6, 526-1, and 526-4 lengthwise overlap the cell boundaries CB and CB'. In some embodiments, the metal conductors 506-7, 506-14, 514-5, 518-1, 518-6, 522-2, 526-1, and 526-4 may be referred to as VSS conductors or VSS lines.

The ILD layer 426 and the IMD 528 each may include one or more dielectric layers including dielectric materials, such as tetraethylorthosilicate (TEOS) oxide, un-doped silicate glass, or doped silicon oxide such as borophosphosilicate glass (BPSG), fluoride-doped silica glass (FSG), phosphosilicate glass (PSG), boron doped silicon glass (BSG), a low-k dielectric material, other suitable dielectric material, or a combination thereof.

The materials of the gate vias 502, the vias 504, the metal conductors 506, the vias 508, the metal conductors 510, the vias 512, the metal conductors 514, the vias 516, the metal conductors 518, the vias 520, the metal conductors 522, the vias 524, and the metal conductors 526 are selected from a group consisting of titanium (Ti), titanium nitride (TiN), tantalum (Ta), tantalum nitride (TaN), titanium aluminum nitride (TiAlN), tungsten nitride (WN), tungsten (W), cobalt (Co), molybdenum (Mo), ruthenium (Ru), platinum (Pt), aluminum (Al), copper (Cu), other conductive materials, or a combination thereof.

As shown in FIGS. 6A to 6F, the metal conductors 526-2 and 526-4 respectively serving as the write word-line and the metal conductors 510-4, 510-9, 518-2, and 518-5 respectively serving as the read word-lines are more concerned about the resistance, so that the metal conductors 510-4, 510-9, 518-2, 518-5, 526-2, and 526-4 may be disposed at the higher metal layer (e.g., the metal layers M2 to M6 discussed above) to have more space, thereby it may be designed with wider width to reduce the resistance. In some embodiments, the metal conductors 510-4, 510-9, 518-2, 518-5, 526-2, and 526-4 may have the widest width than other metal conductors, as shown in FIGS. 6A to 6F. Furthermore, metal conductors 514-2, 514-3, 514-7, and 514-8 may also be designed with wider width, so that reducing the circuit resistance.

In addition, the metal conductors 506-8 and 506-11 serving as the read bit-line is more concerned about the capacitance, so that the metal conductors 506-8 and 506-11 are preferred to put in lowest level metallization layer (e.g., the metal layer M1 discussed above) for bit-line capacitance reduction. This is also means that the crowded space at the interconnection structure in existing technologies are relieved to reduce the routing complexity of the SRAM cells.

Figure 7A:
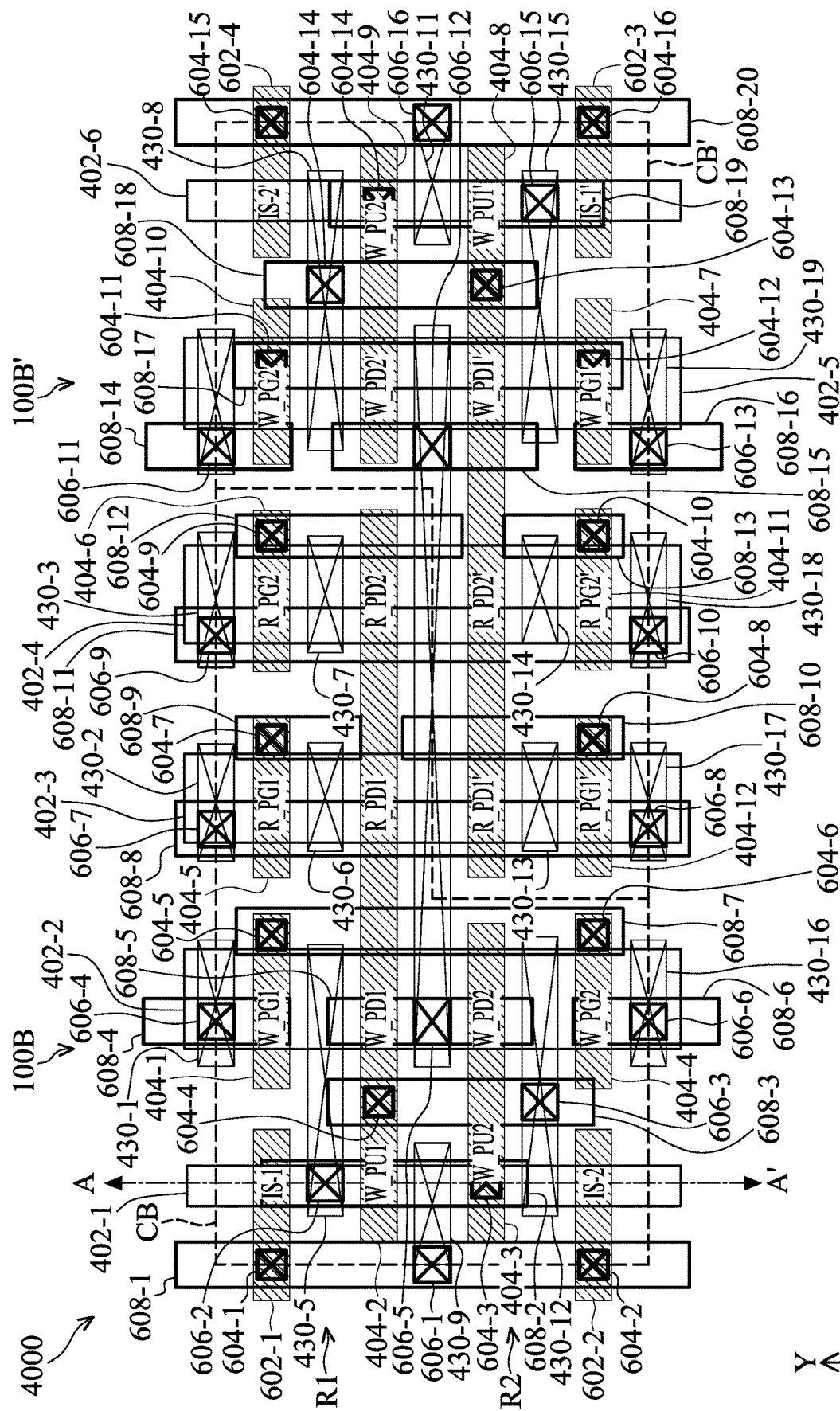
FIG. 7A is a top view (or a layout) of two SRAM cells in adjacent two rows of an array in a portion of an array that can be one embodiment of three-port SRAM cells implemented in the memory region, in accordance with some embodiments of the present disclosure.
Figure 7B:
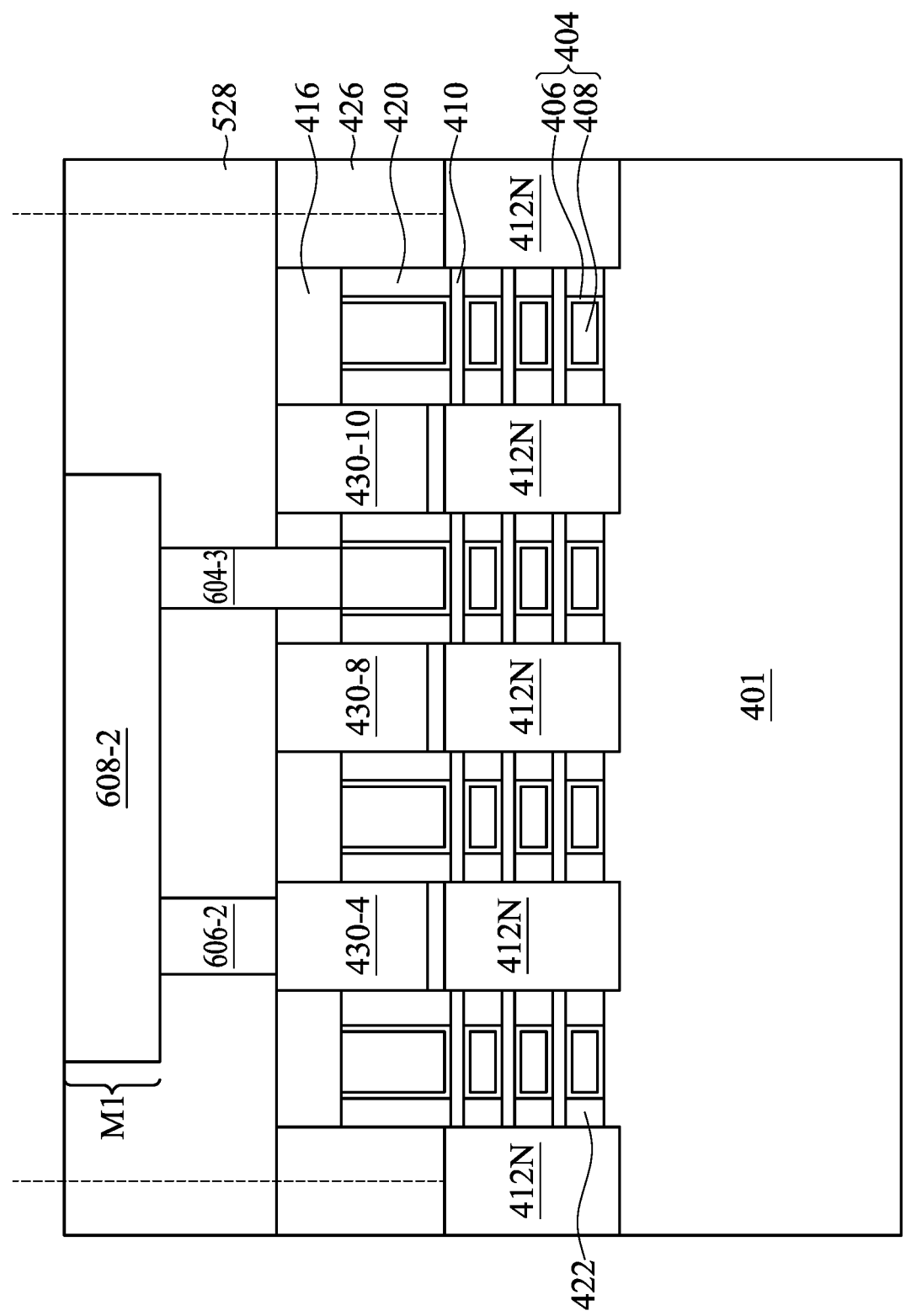
FIG. 7B is a cross-sectional view of the array along a line A-A' in FIG. 7A, in accordance with some embodiments of the present disclosure.

FIG. 7A is a top view (or a layout) of two SRAM cells 100B and 100B' in adjacent two rows of an array 4000 in a portion of the array that can be one embodiment of three-port SRAM cells 100 and 100' implemented in the memory region 20, in accordance with some embodiments of the present disclosure. FIG. 7A illustrates the features in the device region (including transistors), the metal conductors in the first metal layer (M1), and vias vertically between the features and the first metal layer (M1). FIG. 7B is a cross sectional view of the array 4000 along a line A-A' in FIG. 7A, in accordance with some embodiments of the present disclosure. For the sake of simplicity, FIG. 7B shows the features in the device region, the metal conductors in the first metal layer (M1), and vias vertically between the features and the first metal layer (M1). The vias and the metal conductors in higher metal layers (higher than the first metal layer (M1)) are omitted.

The cell structure and interconnection structure shown in FIGS. 7A and 7B are similar to that shown in FIGS. 6A and 6G discussed above, except that except that the SRAM cells 100C and 100C' further include isolation transistors IS-1, IS-2, IS-1', and IS-2'. Referring back to FIGS. 6A and 6G, the active areas 402-1 and 402-6 are not continuous. More specifically, the active areas 402-1 and 402-6 do not extend across the entirety of the array 3000 in the Y-direction. It means that the active areas 402-1 and 402-6 are not shared by the SRAM cells other than the SRAM cells 100A and 100A' in the array 3000. As shown in FIGS. 6A and 6G, the gate structures 404-1, 404-4, 404-7, and 404-10 do not efficiently engage the active areas 402-1 and 402-6 for forming effective transistors.

Referring to FIGS. 7A and 7B, the active areas 402-1 and 402-6 are continuous to extend across the entirety of the array 4000 in the Y-direction. The array 4000 further includes gate structures 602-1 to 602-4 (may be collectively referred to as the gate structures 602) that extend lengthwise in the X-direction. The gate structures 602-1 to 602-4 are similar to the gate structures 404-1 to 404-12. The gate structure 602-1 extends across the active area 402-1 in the top view and engages the active area 402-1 to form the isolation transistor IS-1; the gate structure 602-2 extends across the active area 402-1 in the top view and engages the active area 402-1 to form the isolation transistor IS-2; the gate structure 602-3 extends across the active area 402-6 in the top view and engages the active area 402-6 to form the isolation transistor IS-1'; and the gate structure 602-4 extends across the active area 402-6 in the top view and engages the active area 402-6 to form the isolation transistor IS-2'.

The isolation transistors IS-1, IS-2, IS-1', and IS-2' have the same conductive type as the write-port PU transistors W_PU1, W_PU2, W_PU1', and W_PU2'. In some embodiments, the isolation transistors IS-1, IS-2, IS-1', and IS-2' are p-type transistors, as the write-port PU transistors W_PU1, W_PU2, W_PU1', and W_PU2' discussed above. As shown in FIG. 7A, the isolation transistor IS-1, the write-port PU transistor W_PU1, the write-port PU transistor W_PU2, and the isolation transistor IS-2 are arranged in the Y-direction and share the active area 402-1; and the isolation transistor IS-1', the write-port PU transistor W_PU1', the write-port PU transistor W_PU2', and the isolation transistor IS-2' are arranged in the Y-direction and share the active area 402-6.

As shown in FIGS. 7A and 7B, the SRAM cells 100A and 100A' further include gate vias 604 (including gate vias 604-1 to 604-16), vias 606 (including vias 606-1 to 606-16), and metal conductors 608 (including metal conductors 608-1 to 608-20), which are over the transistors in the SRAM cells 100B and 100B' (e.g., the write-port PG transistors W_PG1, W_PG2, W_PG1', and W_PG2', the write-port PD transistors W_PD1, W_PD2, W_PD1', and W_PD2', the write-port PU transistors W_PU1, W_PU2, W_PU1', and W_PU2', the read-port PG transistors R_PG1, R_PG2, R_PG1', and R_PG2', and the read-port PD transistors R_PD1, R_PD2, R_PD1' and R_PD2').

The gate vias 604, the vias 606, and the metal conductors 608 are in the IMD layer 528. The metal conductors 608 are in the metal layer M1, as discussed above. As show in FIGS. 7A and 7B, the metal conductors 608 extend lengthwise in the Y-direction. Each of the gate vias 604 is vertically between and electrically connected to the respective gate structure 404 and the respective metal conductor 608. Each of the vias 504 is vertically between and electrically connected to the respective source/drain contact 430 and the respective metal conductor 608.

The gate via 604-3, the via 606-2, and the metal conductor 608-2 are similar to the gate via 502-3, the via 504-2, and the metal conductor 506-3; the gate via 604-4, the via 606-3, and the metal conductor 608-3 are similar to the gate via 502-4, the via 504-5, and the metal conductor 506-6; the via 606-4 and the metal conductor 608-4 are similar to the via 504-4 and the metal conductor 506-5; the via 606-5 and the metal conductor 608-5 are similar to the via 504-4 and the metal conductor 506-5; the via 606-6 and the metal conductor 608-6 are similar to the via 504-3 and the metal conductor 506-4; the gate vias 604-5 and 604-6 and the metal conductor 608-7 are similar to the gate vias 502-1 and 502-2 and the metal conductor 506-1; the vias 606-7 and 606-8 and the metal conductor 608-8 are similar to the vias 504-7 and 504-16 and the metal conductor 506-8; the gate via 604-7 and the metal conductor 608-9 are similar to the gate via 502-5 and the metal conductor 506-9; the gate via 604-8 and the metal conductor 608-10 are similar to the gate via 502-12 and the metal conductor 506-10; the vias 606-9 and 606-10 and the metal conductor 608-11 are similar to the vias 504-8 and 504-15 and the metal conductor 506-11; the gate via 604-9 and the metal conductor 608-12 are similar to the gate via 502-6 and the metal conductor 506-12; the gate via 604-10 and the metal conductor 608-13 are similar to the gate via 502-11 and the metal conductor 506-13; the via 606-11 and the metal conductor 608-14 are similar to the via 504-11 and the metal conductor 506-17; the via 606-12 and the metal conductor 608-15 are similar to the via 504-14 and the metal conductor 506-14; the via 606-13 and the metal conductor 608-16 are similar to the via 504-12 and the metal conductor 506-16; the gate vias 604-11 and 604-12 and the metal conductor 608-17 are similar to the gate vias 502-8 and 502-7 and the metal conductor 506-20; the gate via 604-13, the via 606-14, and the metal conductor 608-18 are similar to the gate via 502-10, the via 504-13, and the metal conductor 506-15; and the gate via 604-14, the via 606-15, and the metal conductor 608-19 are similar to the gate via 502-9, the via 504-10, and the metal conductor 506-18.

The metal conductors 608-1 and 608-20 are similar to the metal conductors 506-2 and 506-19 to serve as VDD lines that are electrically coupled to a voltage source (not shown) (e.g., the supply voltage VDD discussed above) and electrically connected to the source/drain features of the write-port PU transistors W_PU1, W_PU2, W_PU1', and W_PU2'. Further, the metal conductors 506-2 and 506-19 electrically connected to the gate structures of the isolation transistors IS-1, IS-2, IS-1', and IS-2', so that the isolation transistors IS-1, IS-2, IS-1', and IS-2' are turned off for isolation.

As shown in FIG. 6A, for the SRAM cell 100B, the metal conductor 608-1 is electrically connected to the source/drain feature 412P shared by the write-port PU transistors W_PU1 and W_PU2 through the via 606-1 and the source/drain contact 430-9, the gate structures 602-1 of the isolation transistors IS-1 through the gate via 604-1, and the gate structures 602-2 of the isolation transistors IS-2 through the gate via 604-2. For the SRAM cell 100B', the metal conductor 608-20 is electrically connected to the source/drain feature 412P shared by the write-port PU transistors W_PU1' and W_PU2' through the via 606-16 and the source/drain contact 430-11, the gate structures 602-3 of the isolation transistors IS-1' through the gate via 604-16, and the gate structures 602-4 of the isolation transistors IS-2' through the gate via 604-15.

As shown in FIGS. 7A and 7B, in the top view, the via 606-1 and the gate vias 604-1 and 604-2 overlap the cell boundary CB, and the via 606-16 and the gate vias 604-15 and 604-16 overlap the cell boundary CB'. Furthermore, in the top view, the metal conductor 608-1 lengthwise overlaps the cell boundary CB and the metal conductor 608-20 lengthwise overlaps the cell boundary CB'. In some embodiments, the metal conductors 608-1 and 608-20 may be referred to as the VDD conductors or the VDD lines.

Figure 8A:
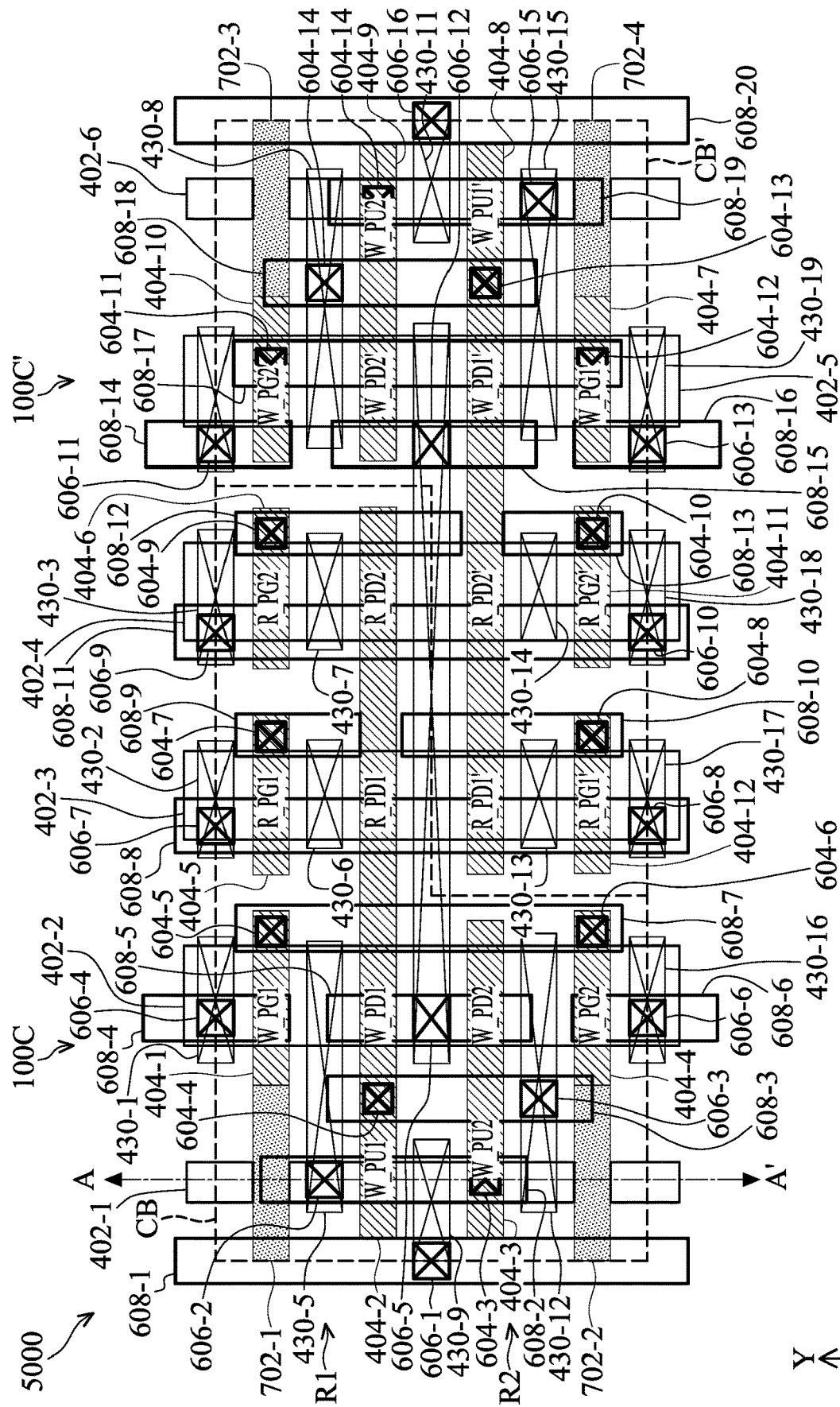
FIG. 8A is a top view (or a layout) of two SRAM cells in adjacent two rows of an array in a portion of an array that can be one embodiment of three-port SRAM cells implemented in the memory region, in accordance with some embodiments of the present disclosure.
Figure 8B:
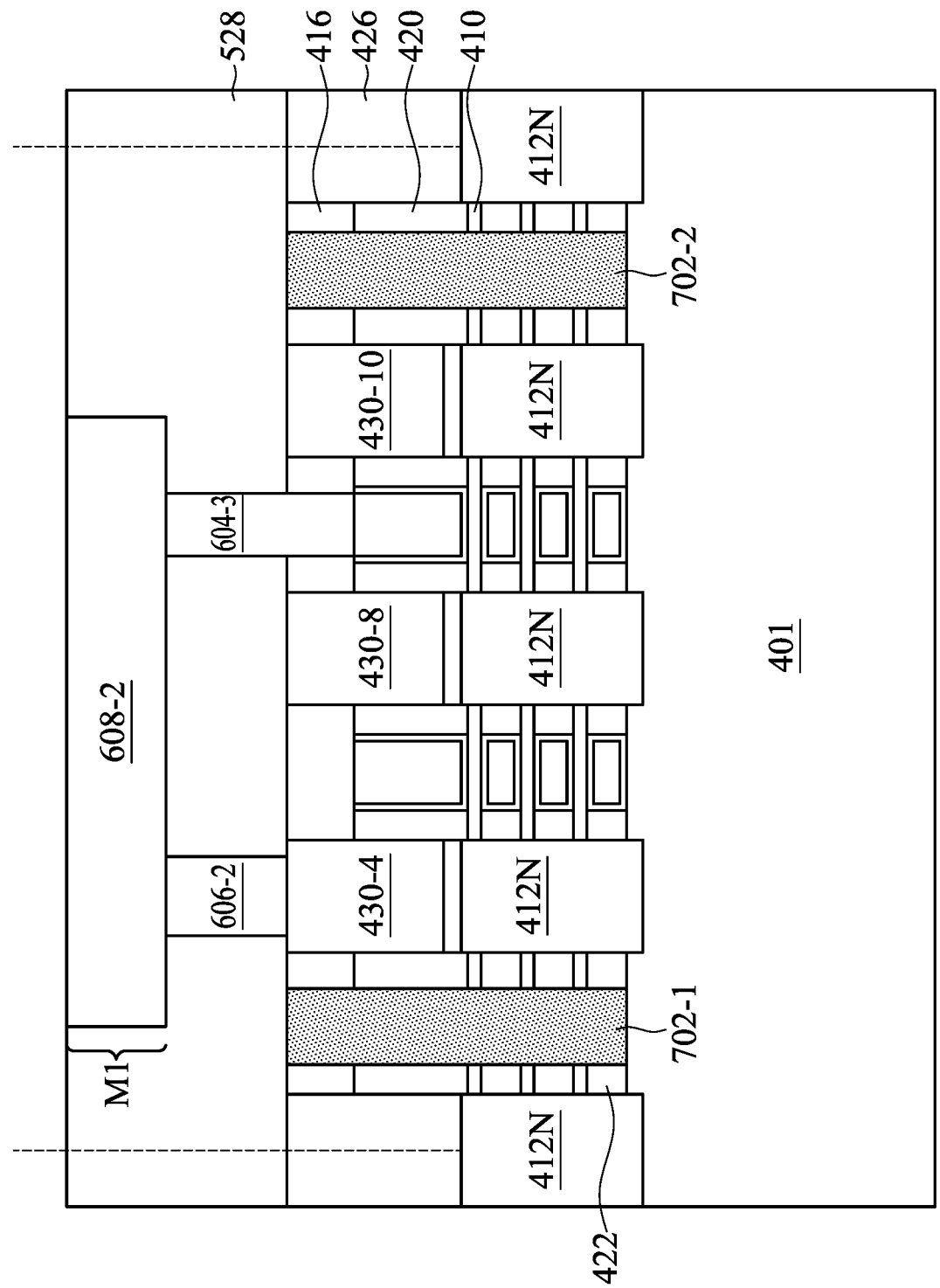
FIG. 8B is a cross-sectional view of the array along a line A-A' in FIG. 8A, in accordance with some embodiments of the present disclosure.

FIG. 8A is a top view (or a layout) of two SRAM cells 100C and 100C' in adjacent two rows of an array 5000 in a portion of the array that can be one embodiment of three-port SRAM cells 100 and 100' implemented in the memory region 20, in accordance with some embodiments of the present disclosure. FIG. 8A illustrates the features in the device region (including transistors), the metal conductors in the first metal layer (M1), and vias vertically between the features and the first metal layer (M1). FIG. 8B is a cross sectional view of the array 5000 along a line A-A' in FIG. 8A, in accordance with some embodiments of the present disclosure. For the sake of simplicity, FIG. 8B shows the features in the device region, the metal conductors in the first metal layer (M1), and vias vertically between the features and the first metal layer (M1). The vias and the metal conductors in higher metal layers (higher than the first metal layer (M1)) are omitted.

The cell structure and interconnection structure shown in FIGS. 8A and 8B are similar to that shown in FIGS. 7A and 7B discussed above, except that the SRAM cells 100C and 100C' further include dielectric structures for cutting the active areas. Referring to FIGS. 8A and 8B, similar to FIGS. 7A and 7B, the active areas 402-1 and 402-6 are continuous to extend across the entirety of the array 5000 in the Y-direction. The difference between the array 4000 in FIGS. 7A and 7B and the array 5000 in FIGS. 8A and 8B is that the array 5000 further includes dielectric structures 702-1 to 702-4 to replace portions of the gate structures 404-1, 404-4, 404-7, and 404-10.

The dielectric structures 702-1 to 702-4 (may be collectively referred to as the dielectric structures 702) extend lengthwise in the X-direction. As shown in FIG. 8A, the dielectric structure 702-1, the write-port PU transistor W_PU1, the write-port PU transistor W_PU2, and dielectric structure 702-2 are arranged in the Y-direction; and the dielectric structure 702-4, the write-port PU transistor W_PU1', the write-port PU transistor W_PU2', and the dielectric structure 702-3 are arranged in the Y-direction. The dielectric structure 702-1 is aligned and in contact with the gate structure 404-1 in the X-direction; the dielectric structure 702-2 is aligned and in contact with the gate structure 404-4 in the X-direction; dielectric structure 702-3 is aligned and in contact with the gate structure 404-10 in the X-direction; and dielectric structure 702-4 is aligned and in contact with the gate structure 404-7 in the X-direction.

The dielectric structures 702-1, 702-2, 702-3, and 702-4 are used for respectively replacing the portions of the gate structures 404-1, 404-4, 404-10, and 404-7 over the active areas 402-1 and 402-6 to cut the active areas 402-1 and 402-6. For an example, as shown in FIG. 8B, the formation of the dielectric structures 702-1 and 702-2 remove the portions of the gate structures and the nanostructures 410 therein to form trenches cutting the active areas 402-1, and then a dielectric material are formed in the trenches to form the dielectric structures 702-1 and 702-2.

Processes for forming the dielectric structures 702 are lithography friendly and cost reduction (no EUV processes and extra mask). In some embodiments, the dielectric structures 702 includes the dielectric material such as $SiO_2$, $Si_3N_4$, SiON, SiOCN, SiOC, SiCN, a metal oxide such as $HrO_2$, $ZrO_2$, hafnium aluminum oxide, and hafnium silicate, or other suitable material, and may be formed by CVD, PVD, ALD, or other suitable methods.

The embodiments disclosed herein relate to memory devices, and more particularly to memory devices including a metal conductor for the read bit-line that is shared by two SRAM cells in adjacent two rows of an SRAM array, in which the metal conductor is in the lowest metal layer, that can improve cell performance of the SRAM cells. Furthermore, the present embodiments provide one or more of the following advantages. The metal conductors for write word-line and read word-line in the higher metal layers may have a wider width to provide a lower circuit resistance, which improves the performance of the SRAM cells, such as RC delay.

Thus, one of the embodiments of the present disclosure describes a memory device that includes a first static random access memory (SRAM) cell, a second SRAM cell, and a first metal layer. The first SRAM cell includes a first read-port pass-gate (PG) transistor and a first read-port pull-down (PD) transistor arranged in a Y-direction, and a second read-port PG transistor and a second read-port PD transistor arranged in the Y-direction. The first read-port PD transistor and the second read-port PD transistor share a first gate structure extending in an X-direction. The second SRAM cell includes a third read-port PG transistor and a third read-port PD transistor arranged in the Y-direction, and a fourth read-port PG transistor and a fourth read-port PD transistor arranged in the Y-direction. The third read-port PD transistor and the fourth read-port PD transistor share a second gate structure extending in the X-direction. The first metal layer is over the first SRAM cell and the second SRAM cell. The first metal layer includes a first read bit-line conductor and a second read bit-line conductor extending in the Y-direction and shared by the first SRAM cell and the second SRAM cell.

In some embodiments, the first read bit-line conductor is electrically connected to a source/drain feature of the first read-port PG transistor and a source/drain feature of the third read-port PG transistor. The second read bit-line conductor is electrically connected to a source/drain feature of the second read-port PG transistor and a source/drain feature of the fourth read-port PG transistor.

In some embodiments, the first SRAM cell has a first non-rectangular cell boundary in a top view and the second SRAM cell has a second non-rectangular cell boundary in the top view.

In some embodiments, the memory device further includes a first source/drain contact, a second source/drain contact, a third source/drain contact, and a fourth source/drain contact. The first source/drain contact and the second source/drain contact extend in the X-direction, lengthwise overlap the first non-rectangular cell boundary, and are respectively over the source/drain feature of the first read-port PG transistor and the source/drain feature of the second read-port PG transistor. The third source/drain contact and the fourth source/drain contact extending the X-direction, lengthwise overlap the second non-rectangular cell boundary, and are respectively over the source/drain feature of the third read-port PG transistor and the source/drain feature of the fourth read-port PG transistor. The first read bit-line conductor is electrically connected to the first source/drain contact and the third source/drain contact, and the second read bit-line conductor is electrically connected to the second source/drain contact and the fourth source/drain contact.

In some embodiments, the first SRAM cell further includes a first write-port pull-up (PU) transistor and a second write-port PU transistor arranged in the Y-direction, and a first write-port PD transistor, a second write-port PD transistor, a first write-port PG transistor, and a second write-port PG transistor arranged in the Y-direction. The second SRAM cell further includes a third write-port PU transistor and a fourth write-port PU transistor arranged in the Y-direction, and a third write-port PD transistor, a fourth write-port PD transistor, a third write-port PG transistor, and a fourth write-port PG transistor arranged in the Y-direction. The first write-port PU transistor and the first write-port PD transistor share the first gate structure. The third write-port PU transistor and the third write-port PD transistor share the second gate structure.

In some embodiments, the first metal layer further includes a first metal conductor and a second metal conductor extending in the Y-direction and electrically coupled to a voltage source. The first metal conductor is electrically connected to a source/drain feature shared by the first write-port PU transistor and the second write-port PU transistor. The second metal conductor is electrically connected to a source/drain feature shared by the third write-port PU transistor and the fourth write-port PU transistor.

In some embodiments, the memory device further includes a second metal layer over the first metal layer. The second metal layer includes a first read word-line conductor and a second read word-line conductor extending in the X-direction. The first read word-line conductor is electrically connected to a gate structure of the first read-port PG transistor. The second read word-line conductor is electrically connected to a gate structure of the fourth read-port PG transistor.

In some embodiments, the memory device further includes a third metal layer over the second metal layer. The third metal layer includes a first write bit-line conductor, a second write bit-line conductor, a first write bit-line-bar conductor, and a second write bit-line-bar conductor extending in the Y-direction. The first write bit-line conductor is electrically connected to a source/drain feature of the first write-port PG transistor. The second write bit-line conductor is electrically connected to a source/drain feature of the third write-port PG transistor. The first write bit-line-bar conductor is electrically connected to a source/drain feature of the second write-port PG transistor. The second write bit-line-bar conductor is electrically connected to a source/drain feature of the fourth write-port PG transistor.

In some embodiments, the memory device further includes a fourth metal layer over the third metal layer. The fourth metal layer includes a third read word-line conductor and a fourth read word-line conductor extending in the X-direction. The third read word-line conductor is electrically connected to a gate structure of the second read-port PG transistor. The fourth read word-line conductor is electrically connected to a gate structure of the third read-port PG transistor.

In some embodiments, the memory device further includes a fifth metal layer over the fourth metal layer. The fifth metal layer includes a first write word-line conductor and a second write word-line conductor extending in the X-direction. The first write word-line conductor is electrically connected to gate structures of the first write-port PG transistor and the second write-port PG transistor. The second write word-line conductor is electrically connected to gate structures of the third write-port PG transistor and the fourth write-port PG transistor.

In another of the embodiments, discussed is a memory device including a first static random access memory (SRAM) cell, a second SRAM cell, and a first metal layer. The first SRAM cell includes a first write-port pull-up (PU) transistor and a second write-port PU transistor sharing a first active area extending in a Y-direction; a first write-port pull-down (PD) transistor, a second write-port PD transistor, a first write-port pass-gate (PG) transistor, and a second write-port PG transistor sharing a second active area extending in the Y-direction; a first read-port PG transistor and a first read-port PD transistor sharing a third active area extending in the Y-direction; and a second read-port PG transistor and a second read-port PD transistor sharing a fourth active area extending in the Y-direction. The second SRAM cell includes a third write-port PU transistor and a fourth write-port PU transistor sharing a fifth active area extending in the Y-direction; a third write-port PD transistor, a fourth write-port PD transistor, a third write-port PG transistor, and a fourth write-port PG transistor sharing a sixth active area extending in the Y-direction; a third read-port PG transistor and a third read-port PD transistor sharing the third active area extending in the Y-direction; and a fourth read-port PG transistor and a fourth read-port PD transistor sharing the fourth active area extending in the Y-direction. The first metal layer is over the first SRAM cell and the second SRAM cell. The first metal layer includes a first read bit-line conductor and a second read bit-line conductor extending in the Y-direction and shared by the first SRAM cell and the second SRAM cell.

In some embodiments, the first metal layer further includes a first metal conductor and a second metal conductor extending in the Y-direction and electrically coupled to a reference voltage. The memory device further includes a source/drain contact extending in the X-direction. The source/drain contact is electrically connected to a source/drain feature shared by the first read-port PD transistor and third read-port PD transistor, a source/drain feature shared by the second read-port PD transistor and fourth read-port PD transistor, a source/drain feature shared by the first write-port PD transistor and the second write-port PD transistor, and a source/drain feature shared by the third write-port PD transistor and the fourth write-port PD transistor.

In some embodiments, the first SRAM cell has a first asymmetric cell boundary in a top view and the second SRAM cell has a second asymmetric cell boundary in the top view.

In some embodiments, the first metal layer further includes a first metal conductor and a second metal conductor extending in the Y-direction and electrically coupled to a voltage source. The first metal conductor lengthwise overlaps the first asymmetric cell boundary and is electrically connected to a source/drain feature shared by the first write-port PU transistor and the second write-port PU transistor. The second metal conductor lengthwise overlaps the second asymmetric cell boundary and is electrically connected to a source/drain feature shared by the third write-port PU transistor and the fourth write-port PU transistor.

In some embodiments, the memory device further includes a first isolation transistor and a second isolation transistor sharing the first active area, and a third isolation transistor and a fourth isolation transistor sharing the fifth active area. The first metal conductor is electrically connected to gate structures of the first isolation transistor and the second isolation transistor. The first metal conductor is electrically connected to gate structures of the third isolation transistor and the fourth isolation transistor.

In some embodiments, the memory device further includes a first dielectric structure and a second dielectric structure cutting the first active area, and a third dielectric structure and a fourth dielectric structure cutting the first active area. The first dielectric structure is aligned and in contact with a gate structure of the first write-port PG transistor in the X-direction and the second dielectric structure is aligned and in contact with a gate structure of the second write-port PG transistor in the X-direction. The third dielectric structure is aligned and in contact with a gate structure of the third write-port PG transistor in the X-direction and the fourth dielectric structure is aligned and in contact with a gate structure of the fourth write-port PG transistor in the X-direction.

In yet another of the embodiments, discussed is a memory device that includes a first static random access memory (SRAM) cell, a second SRAM cell, and a first read bit-line conductor and a second read bit-line conductor. The first SRAM cell includes a first write-port pull-up (PU) transistor and a second write-port PU transistor arranged in a Y-direction; a first write-port pull-down (PD) transistor, a second write-port PD transistor, a first write-port pass-gate (PG) transistor, and a second write-port PG transistor arranged in the Y-direction; a first read-port PG transistor and a first read-port PD transistor; and a second read-port PG transistor and a second read-port PD transistor. The first write-port PU transistor, the first write-port PD transistor, the first read-port PD transistor, and the second read-port PD transistor share a first gate structure extending in an X-direction. The second SRAM cell includes a third write-port PU transistor and a fourth write-port PU transistor arranged in the Y-direction; a third write-port PD transistor, a fourth write-port PD transistor, a third write-port PG transistor, and a fourth write-port PG transistor arranged in the Y-direction; a third read-port PG transistor and a third read-port PD transistor; and a fourth read-port PG transistor and a fourth read-port PD transistor. The third write-port PU transistor, the third write-port PD transistor, the third read-port PD transistor, and the fourth read-port PD transistor share a second gate structure extending in the X-direction. The first read-port PG transistor, the first read-port PD transistor, the third read-port PG transistor, and the third read-port PD transistor are arranged in the Y-direction. The second read-port PG transistor, the second read-port PD transistor, the fourth read-port PG transistor, and the fourth read-port PD transistor are arranged in the Y-direction. The first read bit-line conductor and the second read bit-line conductor extend in the Y-direction and shared by the first SRAM cell and the second SRAM cell.

In some embodiments, the first SRAM cell has a first L-shaped cell boundary in a top view and the second SRAM cell has a second L-shaped cell boundary in the top view.

In some embodiments, the first L-shaped cell boundary and the second L-shaped cell boundary combine to form a rectangle.

In some embodiments, a dimension of the rectangle in the X-direction is greater than a dimension of the rectangle in the Y-direction.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a first static random access memory (SRAM) cell, comprising:
      a first read-port pass-gate (PG) transistor and a first read-port pull-down (PD) transistor arranged in a Y-direction; and
      a second read-port PG transistor and a second read-port PD transistor arranged in the Y-direction, wherein the first read-port PD transistor and the second read-port PD transistor share a first gate structure extending in an X-direction;
   a second SRAM cell, comprising:
      a third read-port PG transistor and a third read-port PD transistor arranged in the Y-direction; and
      a fourth read-port PG transistor and a fourth read-port PD transistor arranged in the Y-direction, wherein the third read-port PD transistor and the fourth read-port PD transistor share a second gate structure extending in the X-direction; and
   a first metal layer over the first SRAM cell and the second SRAM cell, wherein the first metal layer comprises a first read bit-line conductor and a second read bit-line conductor extending in the Y-direction and shared by the first SRAM cell and the second SRAM cell.

2. The memory device of claim 1,
   wherein the first read bit-line conductor is electrically connected to a source/drain feature of the first read-port PG transistor and a source/drain feature of the third read-port PG transistor,
   wherein the second read bit-line conductor is electrically connected to a source/drain feature of the second read-port PG transistor and a source/drain feature of the fourth read-port PG transistor.

3. The memory device of claim 2, wherein the first SRAM cell has a first non-rectangular cell boundary in a top view and the second SRAM cell has a second non-rectangular cell boundary in the top view.

4. The memory device of claim 3, further comprising:
   a first source/drain contact and a second source/drain contact extending in the X-direction, lengthwise overlapping the first non-rectangular cell boundary, and being respectively over the source/drain feature of the first read-port PG transistor and the source/drain feature of the second read-port PG transistor; and
   a third source/drain contact and a fourth source/drain contact extending in the X-direction, lengthwise overlapping the second non-rectangular cell boundary, and being respectively over the source/drain feature of the third read-port PG transistor and the source/drain feature of the fourth read-port PG transistor,
   wherein the first read bit-line conductor is electrically connected to the first source/drain contact and the third source/drain contact, and the second read bit-line conductor is electrically connected to the second source/drain contact and the fourth source/drain contact.

5. The memory device of claim 1,
   wherein the first SRAM cell further comprises:
      a first write-port pull-up (PU) transistor and a second write-port PU transistor arranged in the Y-direction; and
      a first write-port PD transistor, a second write-port PD transistor, a first write-port PG transistor, and a second write-port PG transistor arranged in the Y-direction,
   wherein the second SRAM cell further comprises:
      a third write-port PU transistor and a fourth write-port PU transistor arranged in the Y-direction; and
      a third write-port PD transistor, a fourth write-port PD transistor, a third write-port PG transistor, and a fourth write-port PG transistor arranged in the Y-direction,
   wherein the first write-port PU transistor and the first write-port PD transistor share the first gate structure,
   wherein the third write-port PU transistor and the third write-port PD transistor share the second gate structure.

6. The memory device of claim 5, wherein the first metal layer further comprises a first metal conductor and a second metal conductor extending in the Y-direction and electrically coupled to a voltage source,
   wherein the first metal conductor is electrically connected to a source/drain feature shared by the first write-port PU transistor and the second write-port PU transistor,
   wherein the second metal conductor is electrically connected to a source/drain feature shared by the third write-port PU transistor and the fourth write-port PU transistor.

7. The memory device of claim 5, further comprising:
   a second metal layer over the first metal layer, wherein the second metal layer comprises a first read word-line conductor and a second read word-line conductor extending in the X-direction,
   wherein the first read word-line conductor is electrically connected to a gate structure of the first read-port PG transistor,
   wherein the second read word-line conductor is electrically connected to a gate structure of the fourth read-port PG transistor.

8. The memory device of claim 7, further comprising:
   a third metal layer over the second metal layer, wherein the third metal layer comprises a first write bit-line conductor, a second write bit-line conductor, a first write bit-line-bar conductor, and a second write bit-line-bar conductor extending in the Y-direction, wherein the first write bit-line conductor is electrically connected to a source/drain feature of the first write-port PG transistor, wherein the second write bit-line conductor is electrically connected to a source/drain feature of the third write-port PG transistor, wherein the first write bit-line-bar conductor is electrically connected to a source/drain feature of the second write-port PG transistor, wherein the second write bit-line-bar conductor is electrically connected to a source/drain feature of the fourth write-port PG transistor.

9. The memory device of claim 8, further comprising:
a fourth metal layer over the third metal layer, wherein the fourth metal layer comprises a third read word-line conductor and a fourth read word-line conductor extending in the X-direction, wherein the third read word-line conductor is electrically connected to a gate structure of the second read-port PG transistor, wherein the fourth read word-line conductor is electrically connected to a gate structure of the third read-port PG transistor.

10. The memory device of claim 9, further comprising:
a fifth metal layer over the fourth metal layer, wherein the fifth metal layer comprises a first write word-line conductor and a second write word-line conductor extending in the X-direction, wherein the first write word-line conductor is electrically connected to gate structures of the first write-port PG transistor and the second write-port PG transistor, wherein the second write word-line conductor is electrically connected to gate structures of the third write-port PG transistor and the fourth write-port PG transistor.

11. A memory device, comprising:
a first static random access memory (SRAM) cell, comprising:
  a first write-port pull-up (PU) transistor and a second write-port PU transistor sharing a first active area extending in a Y-direction;
  a first write-port pull-down (PD) transistor, a second write-port PD transistor, a first write-port pass-gate (PG) transistor, and a second write-port PG transistor sharing a second active area extending in the Y-direction;
  a first read-port PG transistor and a first read-port PD transistor sharing a third active area extending in the Y-direction; and
  a second read-port PG transistor and a second read-port PD transistor sharing a fourth active area extending in the Y-direction;
a second SRAM cell abutted to the first SRAM cell, comprising:
  a third write-port PU transistor and a fourth write-port PU transistor sharing a fifth active area extending in the Y-direction;
  a third write-port PD transistor, a fourth write-port PD transistor, a third write-port PG transistor, and a fourth write-port PG transistor sharing a sixth active area extending in the Y-direction;
  a third read-port PG transistor and a third read-port PD transistor sharing the third active area extending in the Y-direction; and
  a fourth read-port PG transistor and a fourth read-port PD transistor sharing the fourth active area extending in the Y-direction; and
a first metal layer over the first SRAM cell and the second SRAM cell, wherein the first metal layer comprises a first read bit-line conductor and a second read bit-line conductor extending in the Y-direction and shared by the first SRAM cell and the second SRAM cell.

12. The memory device of claim 11, wherein the first metal layer further comprises a first metal conductor and a second metal conductor extending in the Y-direction and electrically coupled to a reference voltage, wherein the memory device further comprises:
  a source/drain contact extending in the X-direction, wherein the source/drain contact is electrically connected to a source/drain feature shared by the first read-port PD transistor and third read-port PD transistor, a source/drain feature shared by the second read-port PD transistor and fourth read-port PD transistor, a source/drain feature shared by the first write-port PD transistor and the second write-port PD transistor, and a source/drain feature shared by the third write-port PD transistor and the fourth write-port PD transistor,
  wherein the first metal conductor and the second metal conductor are electrically connected to the source/drain contact.

13. The memory device of claim 11, wherein the first SRAM cell has a first asymmetric cell boundary in a top view and the second SRAM cell has a second asymmetric cell boundary in the top view.

14. The memory device of claim 13, wherein the first metal layer further comprises a first metal conductor and a second metal conductor extending in the Y-direction and electrically coupled to a voltage source,
  wherein the first metal conductor lengthwise overlaps the first asymmetric cell boundary and is electrically connected to a source/drain feature shared by the first write-port PU transistor and the second write-port PU transistor,
  wherein the second metal conductor lengthwise overlaps the second asymmetric cell boundary and is electrically connected to a source/drain feature shared by the third write-port PU transistor and the fourth write-port PU transistor.

15. The memory device of claim 14, further comprising:
a first isolation transistor and a second isolation transistor sharing the first active area, wherein the first metal conductor is electrically connected to gate structures of the first isolation transistor and the second isolation transistor; and
a third isolation transistor and a fourth isolation transistor sharing the fifth active area, wherein the first metal conductor is electrically connected to gate structures of the third isolation transistor and the fourth isolation transistor.

16. The memory device of claim 14, further comprising:
a first dielectric structure and a second dielectric structure cutting the first active area, wherein the first dielectric structure is aligned and in contact with a gate structure of the first write-port PG transistor in the X-direction and the second dielectric structure is aligned and in contact with a gate structure of the second write-port PG transistor in the X-direction; and
a third dielectric structure and a fourth dielectric structure cutting the first active area, wherein the third dielectric structure is aligned and in contact with a gate structure of the third write-port PG transistor in the X-direction and the fourth dielectric structure is aligned and in contact with a gate structure of the fourth write-port PG transistor in the X-direction.

17. A memory device, comprising:
a first static random access memory (SRAM) cell, comprising:
   a first write-port pull-up (PU) transistor and a second write-port PU transistor arranged in a Y-direction;
   a first write-port pull-down (PD) transistor, a second write-port PD transistor, a first write-port pass-gate (PG) transistor, and a second write-port PG transistor arranged in the Y-direction;
   a first read-port PG transistor and a first read-port PD transistor; and
   a second read-port PG transistor and a second read-port PD transistor,
   wherein the first write-port PU transistor, the first write-port PD transistor, the first read-port PD transistor, and the second read-port PD transistor share a first gate structure extending in an X-direction;
a second SRAM cell abutted to the first SRAM cell, comprising:
   a third write-port PU transistor and a fourth write-port PU transistor arranged in the Y-direction;
   a third write-port PD transistor, a fourth write-port PD transistor, a third write-port PG transistor, and a fourth write-port PG transistor arranged in the Y-direction;
   a third read-port PG transistor and a third read-port PD transistor; and
   a fourth read-port PG transistor and a fourth read-port PD transistor,
   wherein the third write-port PU transistor, the third write-port PD transistor, the third read-port PD transistor, and the fourth read-port PD transistor share a second gate structure extending in the X-direction,
   wherein the first read-port PG transistor, the first read-port PD transistor, the third read-port PG transistor, and the third read-port PD transistor are arranged in the Y-direction,
   wherein the second read-port PG transistor, the second read-port PD transistor, the fourth read-port PG transistor, and the fourth read-port PD transistor are arranged in the Y-direction; and
a first read bit-line conductor and a second read bit-line conductor extending in the Y-direction and shared by the first SRAM cell and the second SRAM cell.

18. The memory device of claim 17, wherein the first SRAM cell has a first L-shaped cell boundary in a top view and the second SRAM cell has a second L-shaped cell boundary in the top view.

19. The memory device of claim 18, wherein the first L-shaped cell boundary and the second L-shaped cell boundary combine to form a rectangle.

20. The memory device of claim 19, wherein a dimension of the rectangle in the X-direction is greater than a dimension of the rectangle in the Y-direction.

* * * * *